United States Patent
Ueno et al.

(10) Patent No.: US 10,812,146 B2
(45) Date of Patent: Oct. 20, 2020

(54) CONTROL DEVICE AND METHOD FOR CONTROLLING CONTROL DEVICE

(71) Applicant: SHARP KABUSHIKI KAISHA, Sakai, Osaka (JP)

(72) Inventors: Masafumi Ueno, Sakai (JP); Naoki Shiobara, Sakai (JP); Masaaki Moriya, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/481,390

(22) PCT Filed: Jan. 16, 2018

(86) PCT No.: PCT/JP2018/001061
§ 371 (c)(1),
(2) Date: Jul. 26, 2019

(87) PCT Pub. No.: WO2018/142924
PCT Pub. Date: Aug. 9, 2018

(65) Prior Publication Data
US 2019/0372625 A1    Dec. 5, 2019

(30) Foreign Application Priority Data

Feb. 1, 2017  (JP) ................. 2017-017060

(51) Int. Cl.
*H04B 5/00* (2006.01)
*G06K 7/10* (2006.01)

(52) U.S. Cl.
CPC ....... *H04B 5/0043* (2013.01); *G06K 7/10297* (2013.01); *H04B 5/0031* (2013.01); *H04B 5/0087* (2013.01)

(58) Field of Classification Search
CPC .. H04B 5/0043; H04B 5/0031; H04B 5/0087; G06K 7/10297; G06K 7/10356
(Continued)

(56) References Cited

U.S. PATENT DOCUMENTS 9,363,350 B2 * 6/2016 Rizkallah .......... H04M 1/72522
2016/0004894 A1  1/2016 Tanikawa et al.

FOREIGN PATENT DOCUMENTS

JP    2006-195925 A     7/2006
JP    2006195925 A  *  7/2006
(Continued)

OTHER PUBLICATIONS

English Translation of JP 2006195925 A "Harada, Touch Panel Device, 2006" (Year: 2006).*
(Continued)

*Primary Examiner* — Ayodeji O Ayotunde
(74) *Attorney, Agent, or Firm* — ScienBiziP, P.C.

(57) ABSTRACT

An unwanted process is prevented from being performed due to near field communication based on a process performed via an antenna which is not intended by a user. An information processing apparatus (1) includes a communication antenna determination unit (22) configured to, when a proximity state of an NFC terminal (10) to an NFC antenna (12) continues, determines that the NFC antenna (12) is an NFC antenna (12) that performs near field communication for executing a prescribed process.

4 Claims, 20 Drawing Sheets

(58) Field of Classification Search
USPC .............................................. 455/41.1, 41.3
See application file for complete search history.

(56) References Cited

FOREIGN PATENT DOCUMENTS

| JP | 2014-164745 A | | 9/2014 |
|---|---|---|---|
| JP | 2016-163102 A | | 9/2016 |
| JP | 2016163102 A | * | 9/2016 |
| JP | 2016-177814 A | | 10/2016 |

OTHER PUBLICATIONS

English Translation of JP 2016163102 A "Tsukada, Wireless Tag, Control Method of the Same, Control Program for the Same, and Image Forming Apparatus, 2016" (Year: 2016).*

* cited by examiner

| ANTENNA NO. | THE NUMBER OF TIMES OF DETECTION | TERMINAL ID | PROCESS STATUS |
|---|---|---|---|
| 1 | 0 | — | 0 |
| 2 | 0 | — | 0 |
| 3 | 0 | 4375AD500E0 | 0 |
| 4 | 0 | — | 0 |
| : | : | : | : |

(b)

| ANTENNA NO. | THE NUMBER OF TIMES OF DETECTION | TERMINAL ID | PROCESS STATUS |
|---|---|---|---|
| 1 | 0 | — | 0 |
| 2 | 0 | — | 0 |
| 3 | 0 | — | 0 |
| 4 | 0 | — | 0 |
| : | : | : | : |

(c)

| ANTENNA NO. | THE NUMBER OF TIMES OF DETECTION | TERMINAL ID | PROCESS STATUS |
|---|---|---|---|
| 1 | 0 | — | 0 |
| 2 | 0 | — | 0 |
| 3 | 5 | 4375AD500E0 | 1 |
| 4 | 0 | — | 0 |
| : | : | : | : |

CONTROL DEVICE AND METHOD FOR CONTROLLING CONTROL DEVICE

TECHNICAL FIELD

The following disclosure relates to a control device configured to control a communication apparatus including a plurality of antennas for performing near field communication with an information communication terminal.

BACKGROUND ART

As disclosed in PTL 1 and PTL 2 below, among communication apparatuses for performing near field communication with information communication terminals, communication apparatuses including a plurality of antennas for performing near field communication have recently been developed.

Providing the plurality of antennas enables the communication apparatuses to be applied to various services. For example, it is possible to transmit different pieces of information via respective antennas to information communication terminals or it is possible to perform settlement of different products via respective antennas.

CITATION LIST

Patent Literature

PTL 1: Japanese Patent Application Publication No. 2016-177814 (publication date: Oct. 6, 2016)
PTL 2: Japanese Patent Application Publication No. 2014-164745 (publication date: Sep. 8, 2014)

SUMMARY OF INVENTION

Technical Problem

In the related art as mentioned above, however, a communication apparatus includes a plurality of antennas, and therefore, near field communication based on a process as described above may be performed via an antenna different from the intention of a user. This problem becomes particularly apparent when the communication apparatus is applied to a settlement service of products. That is, as a result of the near field communication performed via an antenna different from the intention of a user, a purchase (settlement process) of a product unwanted by the user may be performed, and the user may suffer a loss.

In view of the foregoing, an object of an aspect of the present disclosure is to realize a control device or the like which prevents an unwanted process from being performed due to near field communication based on a process performed via an antenna which is not intended by a user.

Solution to Problem

To solve the problem, a control device according to the present disclosure is a control device configured to control a communication apparatus including a plurality of antennas for performing near field communication with an information communication terminal, the control device including: a continuation determination unit configured to, as to an antenna which is included in the plurality of antennas and which the information communication terminal is in contact with or proximity to, determine whether or not a contact or proximity state of the information communication terminal continues; a communication antenna determination unit configured to, when the continuation determination unit determines that the contact or proximity state of the information communication terminal continues, determine that the antenna to which the information communication terminal is in proximity is an antenna which performs near field communication for executing a prescribed process.

To solve the problem, a method for controlling a control device according to the present disclosure is a method for controlling a control device configured to control a communication apparatus including a plurality of antennas for performing near field communication with an information communication terminal, the method includes: a continuation determination step of determining, as to an antenna which is included in the plurality of antennas and which the information communication terminal is in contact with or proximity to, whether or not a contact or proximity state of the information communication terminal continues; and a communication antenna determination step of, when the continuation determination step determines that the contact or proximity state of the information communication terminal continues, determining that the antenna to which the information communication terminal is in proximity is an antenna which performs near field communication for executing a prescribed process.

Advantageous Effects of Invention

An aspect of the present disclosure provides the effect of preventing an unwanted process from befog performed due to near field communication based on a process performed via an antenna which is not intended by a user.

BRIEF DESCRIPTION OF DRAWINGS

FIG. 6 is a view illustrating a data structure and a specific example of an NFC table stored in the information processing apparatus shown in FIG. 1.

DESCRIPTION OF EMBODIMENTS

In each of the following embodiments, an example of a data process based on near field communication will be described. Note that the near field communication refers to short-range wireless communication in general. The near field communication includes communication based on, for example, a Radio Frequency IDentification (RFID) technique. Note that examples of the RFID technique include a non-contact IC card and a non-contact IC tag. In each of the following embodiments, Near Field Communication (NFC) will be described as an example of the near field communication.

First Embodiment

A first embodiment of the present disclosure will be described in detail below with reference to FIGS. 1 to 9.

Schema of NFC System 100

Figure 1:
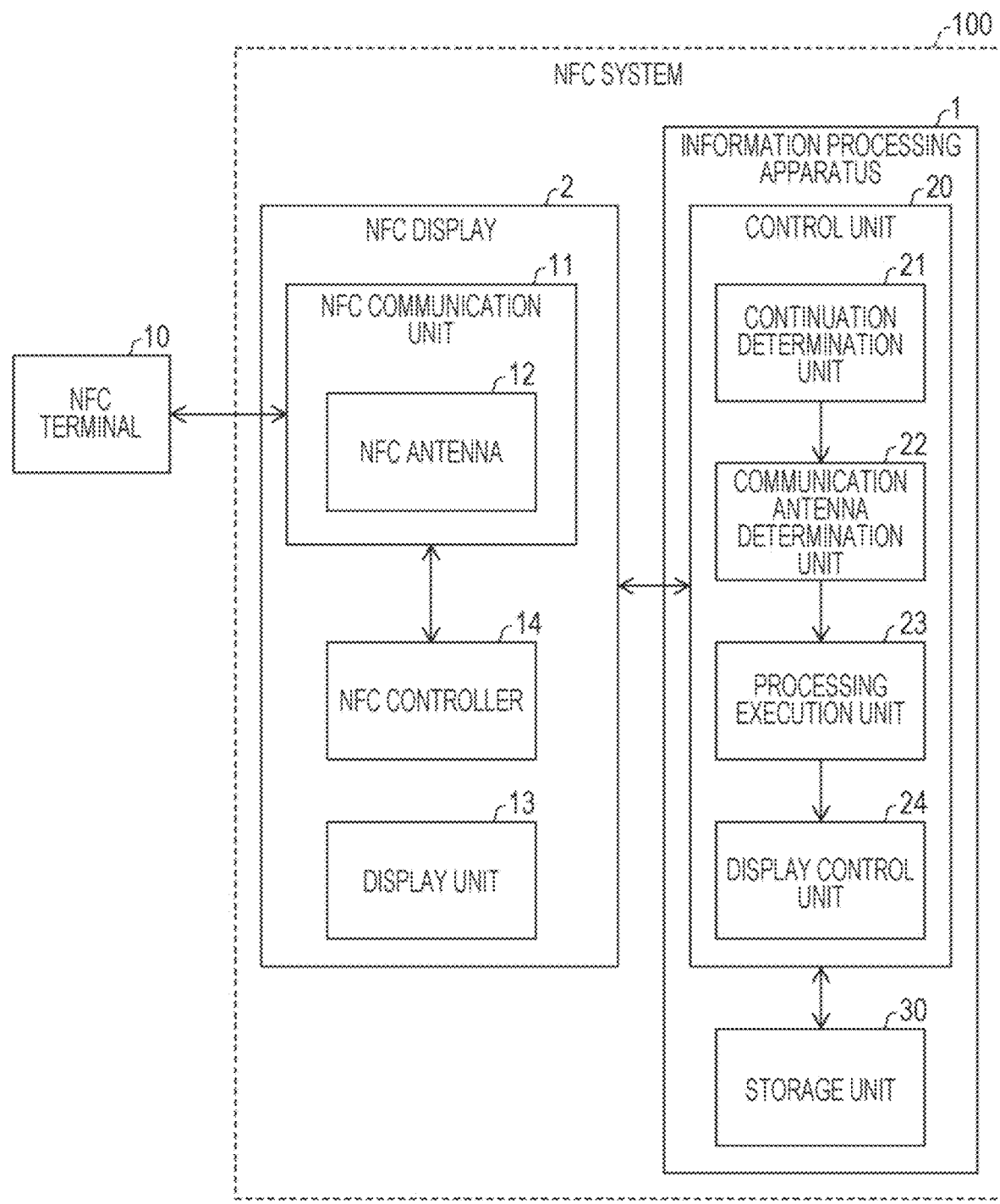
FIG. 1 is a functional block diagram illustrating an example of main components of an information processing apparatus and an NFC display included in an NFC system according to a first embodiment.

First, with reference to FIG. 1, a schema of an NFC system 100 will be described. FIG. 1 is a functional block diagram illustrating an example of main components of an information processing apparatus 1 (control device) and an NFC display 2 (communication apparatus) included in the NFC system 100.

The NFC system 100 performs near field communication with an NFC terminal 10 (information communication terminal) shown in FIG. 1 and executes a process according to a result of the communication. The NFC system 100 includes the information processing apparatus 1 and the NFC display 2 as illustrated in the figure. The information processing apparatus 1 and the NFC display 2 are connected to each other to be able to perform wired or wireless communication with each other.

The NFC terminal 10 is an information processing terminal configured to perform near field communication with the NFC system 100 to cause the NFC system 100 to execute at least one process. The NFC terminal 10 performs near field communication to transmit terminal information stored in the NFC terminal 10 to the NFC system 100. The NFC system 100 executes a process based on the terminal information. Examples of the terminal information include a terminal ID for identifying the NFC terminal 10 and terminal data as unique information that the NFC terminal 10 has. Examples of the terminal information may further include a user ID for identifying a user who uses the NFC terminal 10, an electronic mail address which the user uses, and the like. Moreover, when the NFC terminal 10 is a terminal having an electronic money function, examples of the terminal information may include information denoting the balance of electronic money.

The NFC terminal 10 is at least an information processing terminal capable of performing near field communication with the NFC system 100, and the type of the NFC terminal 10 is not particularly limited. Examples of the NFC terminal 10 include an object to which an NFC tag is attached (for example, a card) and a mobile terminal having an NFC communication function (also referred to as an NFC-equipped mobile terminal).

Main Components of NFC Display 2

Figure 2:
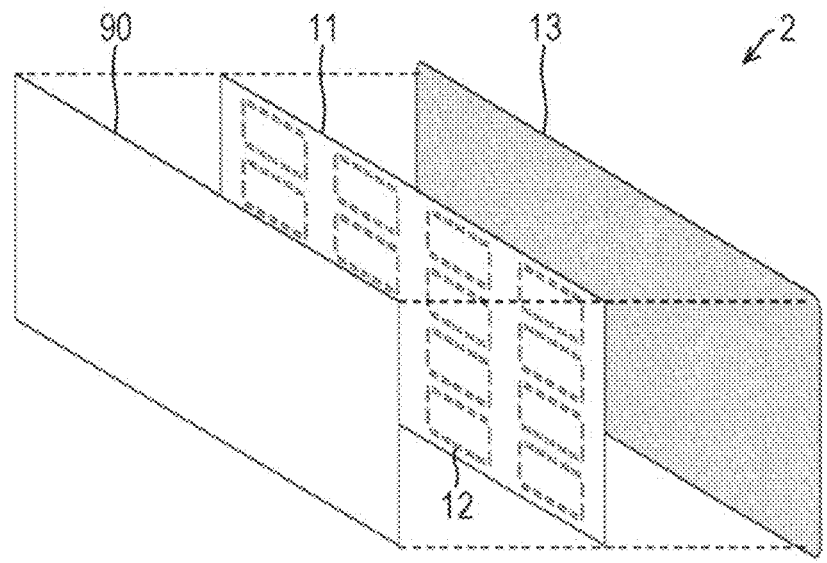
FIG. 2 is a view illustrating a specific configuration of the NFC display shown in FIG. 1.
Figure 3:
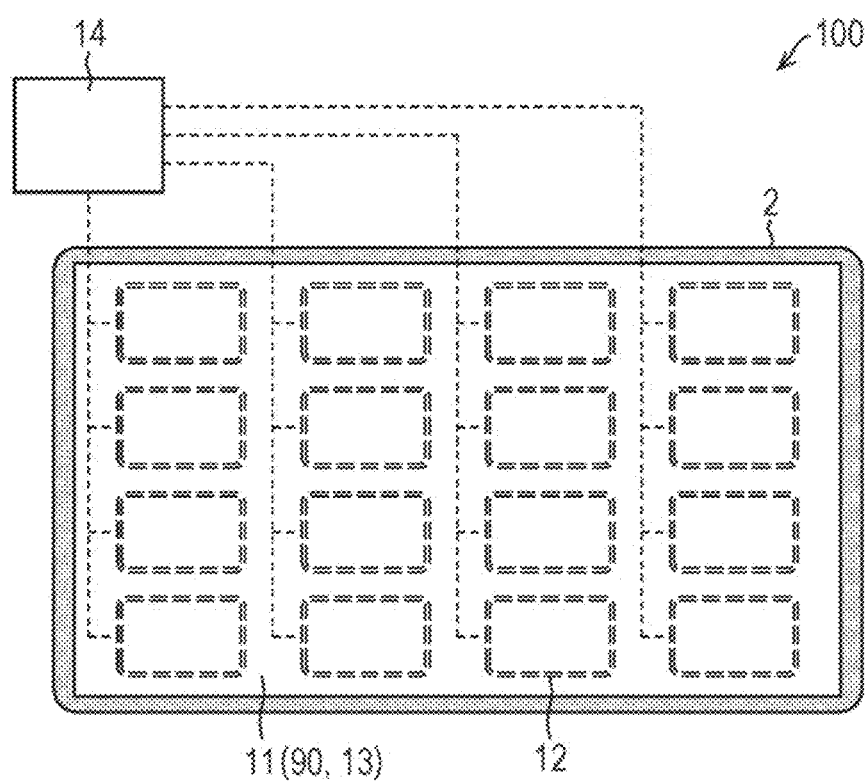
FIG. 3 is a view illustrating an example of wiring in the NFC display shown in FIG. 1.
Figure 4:
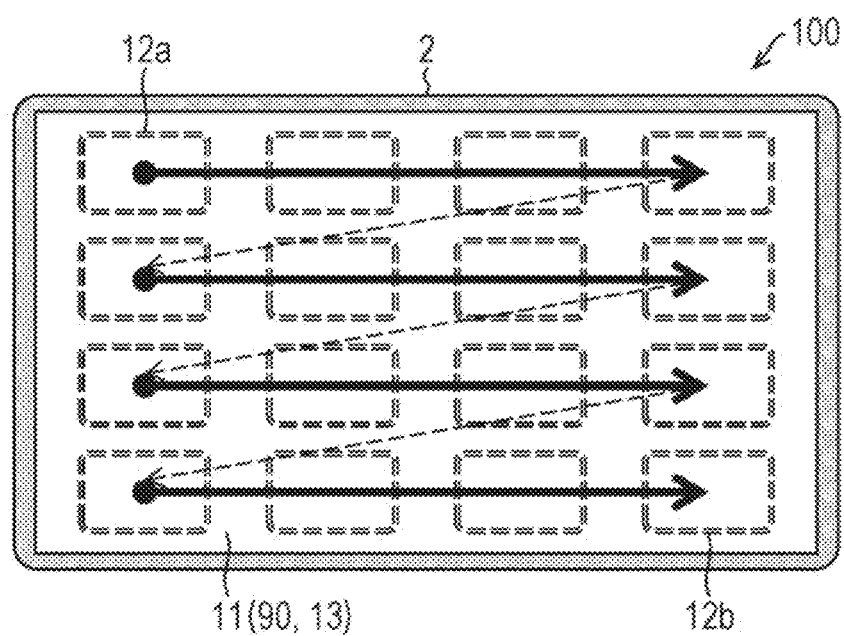
FIG. 4 is a view illustrating an example of scan drive executed by the NFC display shown in FIG. 1.

Next, with reference to FIGS. 1 to 4, main components of the NFC system 2 will be described. FIG. 2 is a view illustrating a specific configuration of the NFC display 2. FIG. 3 is a view illustrating an example of wiring in the NFC display 2. FIG. 4 is a view illustrating an example of scan drive executed by the NFC display 2.

The NFC display 2 is a display having a function of performing near field communication with the NFC terminal 10. As illustrated in FIG. 1, the NFC display 2 includes an NFC communication unit 11, a display unit 13, and an NFC controller 14.

The NFC communication unit 11 is a communication apparatus for performing near field communication with the NFC terminal 10. Specifically, the NFC communication unit 11 is an antenna module including an NFC antenna 12 (antenna). The NFC antenna 12 is a transparent antenna having a function of detecting the NFC terminal 10 and performing near field communication with the NFC terminal 10. The NFC antenna 12 is configured to be able to detect, or perform near field communication with, the NFC terminal 10 even when the NFC terminal 10 is away from the NFC display 2 by a certain distance (for example, about 2 cm to 4 cm). This is to improve the response sensitivity and the response speed to the NFC terminal 10 coming into proximity. Note that in the present disclosure, "proximity" includes that the NFC terminal 10 is in contact with the NFC display 2.

Note that the NFC terminal 10 and the NFC antenna 12 of the present embodiment perform two types of near field communication. Specifically, the NFC terminal 10 and the NFC antenna 12 perform near field communication for detecting the NFC terminal 10 and near field communication based on a process. In the following description, the near field communication for detecting the NFC terminal 10 is referred to as "polling". Moreover, the near field communication based on the process refers to as "data transmission".

The polling is near field communication for determining whether or not the NFC terminal 10 is in proximity of each NFC antenna 12. When the NFC terminal 10 is in proximity to the NFC antenna 12, the NFC antenna 12 acquires a terminal ID from the NFC terminal 10. Note that the NFC antenna 12 may acquire information (for example, terminal type) other than the terminal ID by polling.

The data transmission is near field communication for performing transmission and reception of data for performing various types of processes or data based on the various types of processes performed between the NFC terminal 10 and the NFC antenna 12. For example, when the various types of processes correspond to a settlement process, the NFC antenna 12 acquires, from the NFC terminal 10, information required for settlement. Note that the information required for settlement is information regarding a credit card, the balance of electronic money, and the like. Moreover, for example, when the various types of processes correspond to an acquisition process of an URL for a website, the NFC antenna 12 transmits the URL to the NFC terminal 10.

The display unit 13 is a display device configured to display images. The display unit 13 is, for example, a Liquid Crystal Display (LCD) but is not limited to this example. Moreover, the display unit 13 may include backlight.

Here, with reference to FIG. 2, configuration examples of the various types of devices in the NFC display 2 will be described. The NFC display 2 according to the present embodiment includes the NFC communication unit 11 and protection glass 90 (not shown in FIG. 1) superimposed in this order on the display unit 13. That is, the NFC display 2 includes the protection glass 90, the display unit 13, and the NFC communication unit 11 sandwiched therebetween.

As illustrated in FIG. 2, the NFC communication unit 11 includes a plurality of NFC antennas 12. Note that in the example shown in FIG. 2, the number of NFC antennas 12 is 12, and the NFC antennas 12 are arranged in a 3×4 matrix. Note that the number and the arrangement of the NFC antennas 12 are not limited to this example. For example, the NFC antennas 12 may be disposed at only four corners of the NFC communication unit 11.

Moreover, in the example shown in FIG. 2, the NFC communication unit 11 and the display unit 13 are devices having substantially the same area, but the area of the NFC communication unit 11 and the area of the display unit 13 may be different from each other. For example, the NFC communication unit 11 may be smaller than the display unit 13. In this example, only a partial area of the NFC display 2 is an area in which near field communication is possible.

The NFC controller 14 controls operation of the NFC antennas 12. Specifically, the NFC controller 14 controls driving of the NFC antennas 12 based on a control signal from a control unit 20 (which will be described later) of the information processing apparatus 1. As illustrated in FIG. 3, the NFC controller 14 according to the present embodiment is connected to each of the NFC antennas 12 by wire. Thus, the NFC controller 14 is able to bring each NFC antenna 12 into an actuated state or an unactuated state. Note that the actuated state refers to a state in which near field communication with the NFC terminal 10 is executable. Note that the unactuated state refers to a state in which near field communication with the NFC terminal 10 is not executable.

More specifically, when the NFC controller 14 executes polling, the NFC antenna 12 in the actuated state outputs a detection signal for detecting the NFC terminal 10. When NFC terminal 10 is present in the vicinity of the NFC antenna 12, the NFC terminal 10 receives the detection signal and outputs a response signal. The NFC controller 14 receives the response signal via the NFC antennas 12, thereby detecting the NFC terminal 10. Note that the response signal includes the terminal ID described above. Note that the response signal may include other information.

The NFC controller 14 according to the present embodiment performs the scan drive of switching the NFC antennas 12 to be driven in a prescribed order in order to detect the NFC terminal 10. That is, the NFC controller 14 sequentially switches the NFC antennas 12 to be driven to perform polling. Specifically, the NFC controller 14 sequentially switches the NFC antennas 12 to be driven to cause the detection signal to be output. Thus, only one NFC antenna 12 is driven at a point of time. Thus, the NFC display 2 enables power consumption to be reduced and interference of the NFC antennas 12 adjacent to each other to be prevented.

The NFC controller 14 acquires a control signal including driving order information and cycle information from the control unit 20. In the driving order information, antenna IDs identifying the NFC antennas 12 are associated with the order of driving. The cycle information denotes a polling cycle. The NFC controller 14 starts the scan drive of the NFC antennas 12 according to the control signal. For example, the NFC controller 14 may perform the scan drive on the NFC antenna 12a to the NFC antenna 12b in the order indicated by the arrow shown in FIG. 4. Note that the NFC controller 14 according to the present embodiment drives each of the NFC antennas 12 once in the prescribed order and then repeats driving of the NFC antennas 12 in the prescribed order. That is, in the example shown in FIG. 4, the NFC controller 14 drives the NFC antenna 12b and then drives the NFC antenna 12a to perform the scan drive in the order indicated by the arrow shown in the figure.

Moreover, when any one of the NFC antennas 12 detects the NFC terminal 10, the NFC controller 14 according to the present embodiment transmits, to the information processing apparatus 1, an antenna ID for identifying the NFC antenna 12 with which the NFC terminal 10 is detected. Moreover, the NFC controller 14 transmits the terminal ID acquired from the NFC terminal 10 together with the antenna ID to the information processing apparatus 1. Note that at this time, the NFC controller 14 does not stop the scan drive. Moreover, the antenna ID is at least information based on which the NFC antennas 12 is identifiable. For example, the antenna ID may be a digit, and in the present embodiment, an example in which the antenna ID is a digit will be described.

Schema and Main Components of Information Processing Apparatus 1

Figure 5:
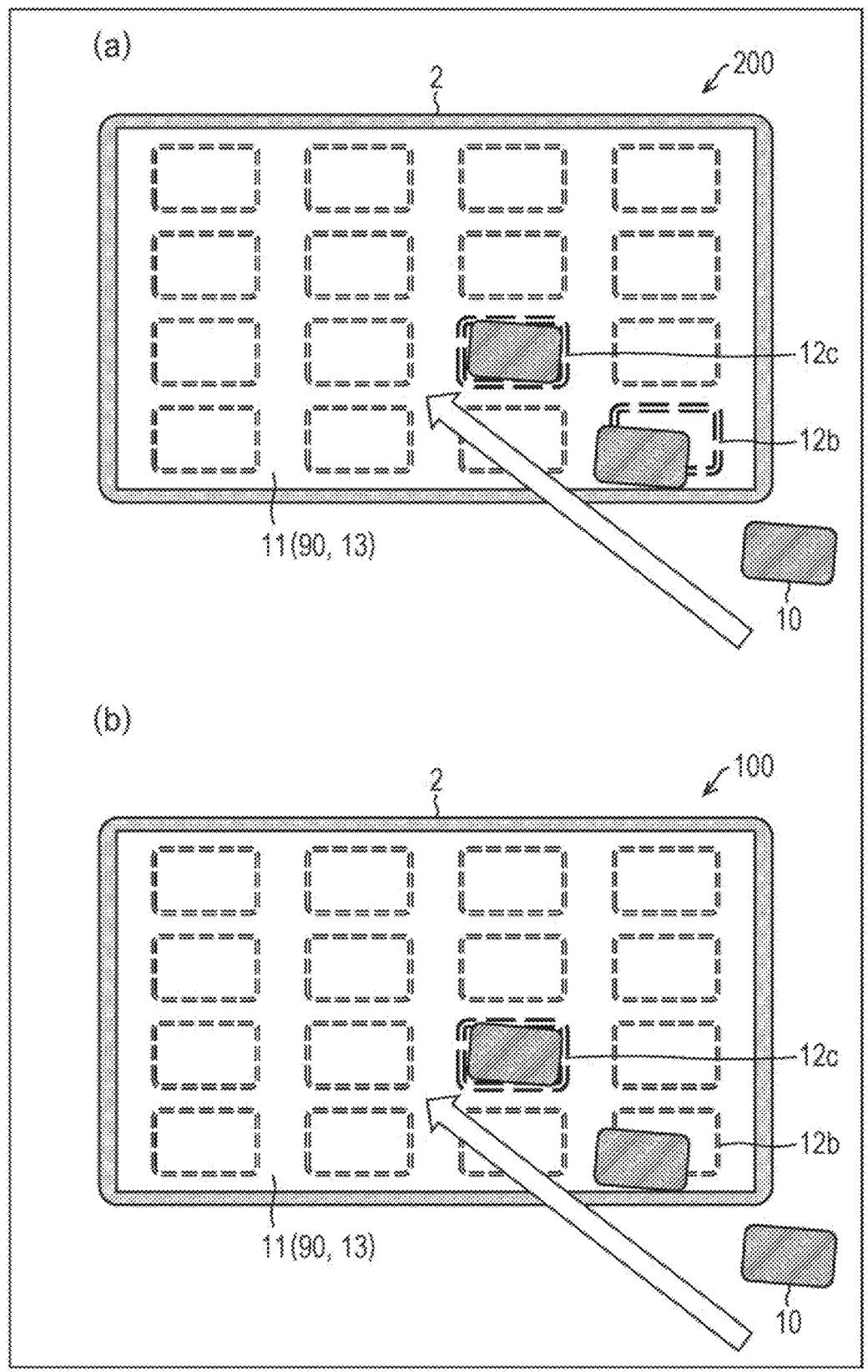
FIG. 5 is a view illustrating an overview of a process executed by the NFC system shown in FIG. 1.

Next, with reference to FIGS. 1 to 5, a schema and main components of the information processing apparatus 1 will be described. FIG. 5 is a view illustrating an overview of a process executed by the NFC system, wherein (a) in FIG. 5 is a view illustrating an overview of a process executed by the conventional NFC system 200, and (b) in FIG. 5 is a view illustrating an overview of a process executed by the NFC system 100 according to the present embodiment. Note that in FIG. 5, an NFC antenna 12 drawn in a thick line indicates an NFC antenna 12 that performs data transmission to the NFC terminal 10. On the other hand, an NFC antenna 12 drawn in a thin line indicates an NFC antenna 12 that does not perform data transmission to the NFC terminal 10.

In the present embodiment, as indicated by the arrow in FIG. 5, an example will be described in which a user moves the NFC terminal 10 to pass above the NFC antenna 12b to the NFC antenna 12c so as to perform data transmission by using the NFC antenna 12c. In the case of the NFC system 200, as illustrated in (a) in FIG. 5, when the NFC terminal 10 passes above the NFC antenna 12b, data transmission may be performed between the NFC terminal 10 and the NFC antenna 12b. That is, data transmission unintended by a user may be performed.

On the other hand, when a proximity state of the NFC terminal 10 to the NFC antenna 12 continues, the information processing apparatus 1 included in the NFC system 100 causes the NFC display 2 to perform data transmission between the NFC antenna 12 and the NFC terminal 10. That is, in the example described above, the NFC terminal 10 passes over the NFC antenna 12b in a short time. Thus, as illustrated in (b) in FIG. 5, the information processing apparatus 1 does not cause the NFC display 2 to perform data transmission between the NFC antenna 12b and the NFC terminal 10. Specifically, the NFC terminal 10 may be detected by the NFC antenna 12b due to polling but does not perform data transmission to the NFC antenna 12. Thus, the information processing apparatus 1 enables data transmission unintended by a user to be prevented.

Subsequently, the main components of the information processing apparatus 1 will be described. As illustrated in FIG. 1, the information processing apparatus 1 includes the control unit 20 and a storage unit 30. The control unit 20 comprehensively controls components of the information processing apparatus. Moreover, the storage unit 30 stores various types of data to be used by the information processing apparatus 1.

The control unit 20 includes a continuation determination unit 21, a communication antenna determination unit 22, a processing execution unit 23, and the display control unit 24.

The continuation determination unit 21 determines, as to an NFC antenna 12 which is included in the plurality of NFC antennas 12 and which the NFC terminal 10 is in proximity to, whether or not the proximity state of the NFC terminal 10 continues. The continuation determination unit 21 refers to an NFC table stored in the storage unit 30 to determine whether or not the proximity state of the NFC terminal 10 continues.

Here, with reference to FIG. 6, the NFC table will be described in detail. FIG. 6 is a view illustrating a data structure and a specific example of the NFC table. The NFC table stores the antenna ID of each NFC antenna 12 provided to the NFC display 2 in association with various types of information. In the column "antenna No.", the antenna ID of each NFC antenna 12 is stored. In the column "the number of times of detection", the number of times of continuously detecting the NFC terminal 10 by each of the NFC antenna 12 is stored. In the column "terminal ID", the terminal ID of the NFC terminal 10 most recently detected by each NFC antenna 12 is stored. In the column "process status", a flag is stored. The flag indicates whether or not data transmission by using each NFC antenna 12 (and process relating to the communication) has been executed. Note that in the example shown in the figure, "0" is a flag that indicates that the data transmission has not been executed, and "1" is a flag that indicates that the data transmission has been executed.

When the continuation determination unit 21 acquires the antenna ID and the terminal ID from the NFC controller 14, the continuation determination unit 21 determines whether or not in the NFC table, a terminal ID in the same row as the antenna ID acquired matches the terminal ID acquired.

If the terminal ID in the NFC table does not match the terminal ID acquired, the continuation determination unit 21 stores the terminal ID acquired in a cell which is included in cells in the column "terminal ID" and which is in the same row as a cell storing the antenna ID acquired. Note that "a terminal ID in the same row as the antenna ID acquired does not match the terminal ID acquired" includes a case where the terminal ID is not stored in a cell which is included in the column "terminal ID" and which is in the same row as the antenna ID acquired. Moreover, the continuation determination unit 21 changes, to 1, 0 in a cell which is included in cells of "the number of times of detection" and which is in the same row as the cell storing the antenna ID acquired.

A specific example of this process will be described with reference to FIG. 6(a). The specific example describes a case where the continuation determination unit 21 acquires 3 as the antenna ID and 4375AD500E0 as the terminal ID. The continuation determination unit 21 stores 4375AD500E0 in a cell which is in the column "terminal ID" and which is in the same row as the cell of 3 in the column "antenna No." Then, the continuation determination unit 21 stands by until the continuation determination unit 21 acquires the antenna ID and the terminal ID from the NFC controller 14 again.

If the terminal ID in the same row as the antenna ID acquired matches the terminal ID acquired, the continuation determination unit 21 increments, by 1, the digit included in a cell which is included in cells of "the number of times of detection" and which is in the same row as the cell storing the terminal ID acquired. The continuation determination unit 21 determines whether or not a digit obtained by incrementing the digit by 1 reaches a prescribed digit. Here, an example in which the prescribed digit is 5 will be described.

If the digit obtained by incrementing the digit by 1 does not reach 5, the continuation determination unit 21 stands by until the continuation determination unit 21 acquires the antenna ID and the terminal ID from the NFC controller 14 again. In contrast, if the digit obtained by incrementing the digit by 1 reaches 5 as illustrated in FIG. 6(c), the continuation determination unit 21 determines, as to the NFC antenna 12 which the NFC terminal 10 is in proximity to, that the proximity state of the NFC terminal 10 continues. Then, the continuation determination unit 21 outputs the antenna ID acquired to the communication antenna determination unit 22. Moreover, the continuation determination unit 21 changes the flap from 0 to 1 as illustrated in FIG. 6(c) in a cell which is included in cells of "process status" and which is in the same row as the cell storing the antenna ID acquired. Details of the process will be described later. Moreover, the continuation determination unit 21 transmits, to the NFC controller 14, a stop instruction for stopping the scan drive. Thus, the NFC controller 14 stops the scan drive.

On the other hand, when the NFC terminal 10 moves away from the NFC antenna 12 indicated by the most recently acquired antenna ID, the NFC antenna 12 cannot acquire the response signal. Thus, the continuation determination unit 21 cannot acquire the antenna ID and the terminal ID after giving the instruction to the NFC controller 14. In this case, the continuation determination unit 21 deletes, as illustrated in FIG. 6(b), the terminal ID stored in the cell which is included in the cells of "terminal ID" and which is in the same row as the most recently acquired antenna ID. Moreover, as illustrated in FIG. 6(b), the continuation determination unit 21 returns, to 0, the digit stored in a cell which is included in the cells of "the number of times of detections" and which is in the same row as the most recently acquired antenna ID.

That is, when an NFC antenna 12 sequentially acquires a response from the NFC terminal 10 for a predetermined number of times, the continuation determination unit 21 determines, as to the NFC antenna 12, that the proximity state of the NFC terminal 10 continues. Note that the response is a response to the detection signal for detecting the NFC terminal 10 transmitted from the NFC display 2.

The communication antenna determination unit 22 determines the NFC antenna 12 with which the near field communication (data transmission) for executing a predetermined process is performed. Specifically, when the communication antenna determination unit 22 acquires the antenna ID from the continuation determination unit 21, the communication antenna determination unit 22 determines that the NFC antenna 12 indicated by the antenna ID is the NFC antenna 12 that performs the data transmission. The continuation antenna determination unit 22 outputs the antenna ID acquired, that is, the antenna ID indicating the NFC antenna 12 that performs the data transmission to the communication antenna determination unit 23. Note that in place of the configuration in which the continuation determination unit 21 transmits the stop instruction of the scan drive, the communication antenna determination unit 22 may be configured to transmit the stop instruction. Specifically, when the communication antenna determination unit 22 determines the NFC antenna 12 that performs the data transmission, the communication antenna determination unit 22 transmits the stop instruction of the scan drive to the NFC controller 14.

The processing execution unit 23 causes the NFC display 2 to perform data transmission and executes a prescribed process based on information acquired by the data transmission. Specifically, when the processing execution unit 23 acquires the antenna ID from the communication antenna determination unit 22, the processing execution unit 23 gives an instruction to the NFC controller 14 to perform data transmission to the NFC terminal 10 by using the NFC antenna 12 indicated by the antenna ID. The NFC controller 14 performs the data transmission in accordance with the instruction, and when the NFC controller 14 acquires the terminal information from the NFC terminal 10, the NFC controller 14 transmits the terminal information to the processing execution unit 23. The processing execution unit 23 executes the prescribed process based on the terminal information received.

Moreover, the processing execution unit 23 outputs an instruction regarding image display to the display control unit 24 at a prescribed timing during a period from the acquisition of the antenna ID to the execution of the prescribed process. For example, the processing execution unit 23 instructs, at the timing of giving the instruction to the NFC controller 14, the display control unit 24 to display an image indicating that communication is being performed. Moreover, the processing execution unit 23 instructs, after execution of the prescribed process, the display control unit 24 to display an image indicating that the process is finished. Note that the above-described timing and the contents of the instruction are mere examples. That is, the contents of the instruction given by the processing execution unit 23 to the display control unit 24 and the timing at which the instruction is output are not limited to this example.

The display control unit 24 causes the display unit 13 to display an image. The display control unit 24 causes the display unit 13 to display the prescribed image or causes the display unit 13 to display an image according to the instruction given by the processing execution unit 23 at the timing at which the information processing apparatus 1 is activated. Note that the image displayed on the display unit 13 may be read from the storage unit 30 or may be generated by the display control unit 24 from data read from the storage unit 30.

Flow of Process Executed by NFC System 100

Figure 7:
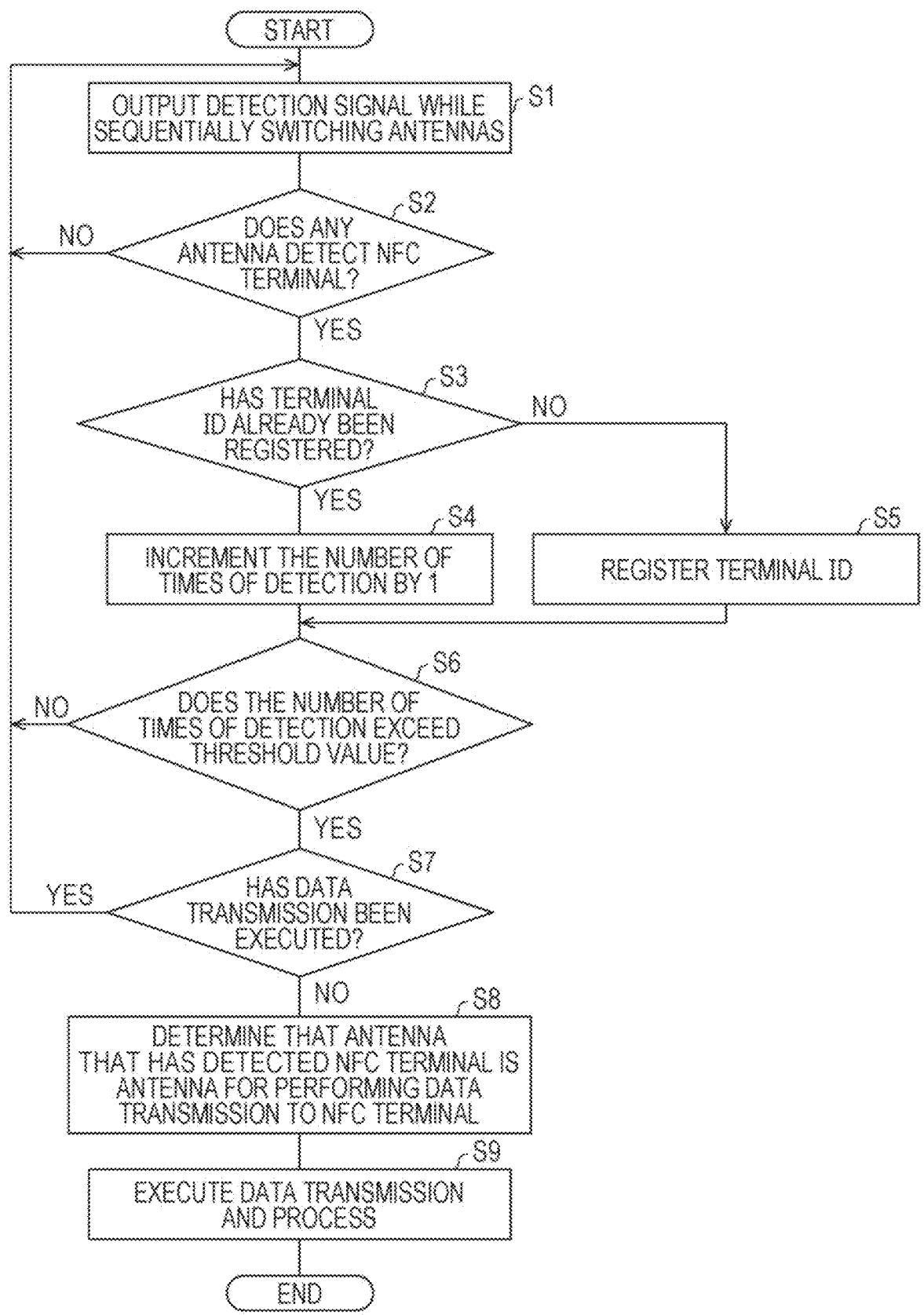
FIG. 7 is a flowchart illustrating an example of a flow of the process executed by the NFC system shown in FIG. 1.

Next, with reference to FIG. 7, a flow of a process executed by the NFC system 100 will be described. FIG. 7 is a flowchart illustrating an example of the flow of the process executed by the NFC system 100.

First, the NFC controller 14 of the NFC display 2 starts the scan drive of the NFC antennas 12 according to the control signal from the control unit 20 of the information processing apparatus 1. Specifically, the NFC controller 14 outputs the detection signal while sequentially switching the NFC antennas 12 to be driven (step S1, hereinafter "step" will be omitted). The NFC controller 14 repeats the process in step S1 until any one of the NFC antennas 12 detects the NFC terminal 10 (NO in S2).

When any one of the NFC antennas 12 detects the NFC terminal 10 (YES in S2), the NFC controller 14 transmits the terminal ID acquired from the NFC terminal 10 and the antenna ID of the NFC antenna 12 that has detected the NFC terminal 10 to the control unit 20 of the information processing apparatus 1.

The continuation determination unit 21 of the control unit 20 determines whether or not the terminal ID acquired has already been registered (S3). Specifically, the continuation determination unit 21 determines whether or not, in the NFC table, the terminal ID acquired is stored in the same row as the antenna ID acquired. If the continuation determination unit 21 determines that the terminal ID acquired has not been registered (NO in S3), the continuation determination unit 21 registers the terminal ID acquired (S5). Specifically, the continuation determination unit 21 stores the terminal ID acquired in a cell which is included in cells of "terminal ID" and which is in the same row as the cell storing the antenna ID acquired. Note that when the NFC system 100 first executes the determination in step S3, the terminal ID is not registered in the NFC table. Thus, a determination result in step S3 is necessarily "NO".

On the other hand, when the continuation determination unit 21 determines that the terminal ID acquired has been registered (YES in S3), the continuation determination unit 21 increments the number of times of detection by 1 (S4) in a cell which is included in cells of "the number of times of detection" and which is in the same row as the cell storing the antenna ID acquired. Then, the continuation determination unit 21 determines whether or not the number of times of detection of the NFC terminal 10 exceeds the threshold value (S6, continuation determination step). If the number of times of detection does not exceed the threshold value (NO in S6), the process executed by the NFC system 100 returns to step S1.

On the other hand, if the number of times of detection exceeds the threshold value (YES in S6), the continuation determination unit 21 outputs the antenna ID acquired to the communication antenna determination unit 22. Then, the continuation determination unit 21 determines whether or not data transmission has been executed by the antenna with which the NFC terminal is detected (S7). Specifically, the continuation determination unit 21 determines whether or not flag "1" denoting that the data transmission has been executed is stored in the cell which is included in cells of "process status" and which is in the same row as the cell storing the antenna ID acquired. If the continuation determination unit 21 determines that the data transmission has been executed (YES in S7), the process executed by the NFC system 100 returns to step S1. Thus, after the prescribed process is performed, even when the same NFC terminal 10 is in proximity to the NFC antenna 12 that has executed the data transmission, the same process is not repeatedly performed. Thus, the information processing apparatus 1 enables data transmission and execution of a process unintended by a user to be prevented.

On the other hand, when the continuation determination unit 21 determines that the data transmission has not been executed (NO in S7), the continuation determination unit 21 changes the flag from 0 to 1 in the cell which is included in cells of "process status" and which is in the same row as the cell storing the antenna ID acquired. Then, the continuation determination unit 21 outputs the antenna ID acquired to the communication antenna determination unit 22. Moreover, the continuation determination unit 21 transmits, to the NFC controller 14, the stop instruction for stopping the scan drive.

The communication antenna determination unit 22 determines that the NFC antenna 12 indicated by the antenna ID acquired is the NFC antenna 12 that performs the data transmission to the NFC terminal 10 (S8, communication antenna determination step). The continuation antenna determination unit 22 outputs the antenna ID acquired to the processing execution unit 23.

When the processing execution unit 23 acquires the antenna ID, the processing execution unit 23 executes the prescribed process (S9). Specifically, the processing execution unit 23 gives an instruction to the NFC controller 14 to perform data transmission to the NFC terminal 10 by using the NFC antenna 12 indicated by the antenna ID acquired. The NFC controller 14 performs the data transmission in accordance with the instruction, and when the NFC controller 14 acquires the terminal information from the NFC terminal 10, the NFC controller 14 transmits the terminal information to the processing execution unit 23. The processing execution unit 23 executes the prescribed process based on the terminal information received. Thus, the process executed by the NFC system 100 ends.

Specific Example of Process Executed by NFC System 100

Figure 8:
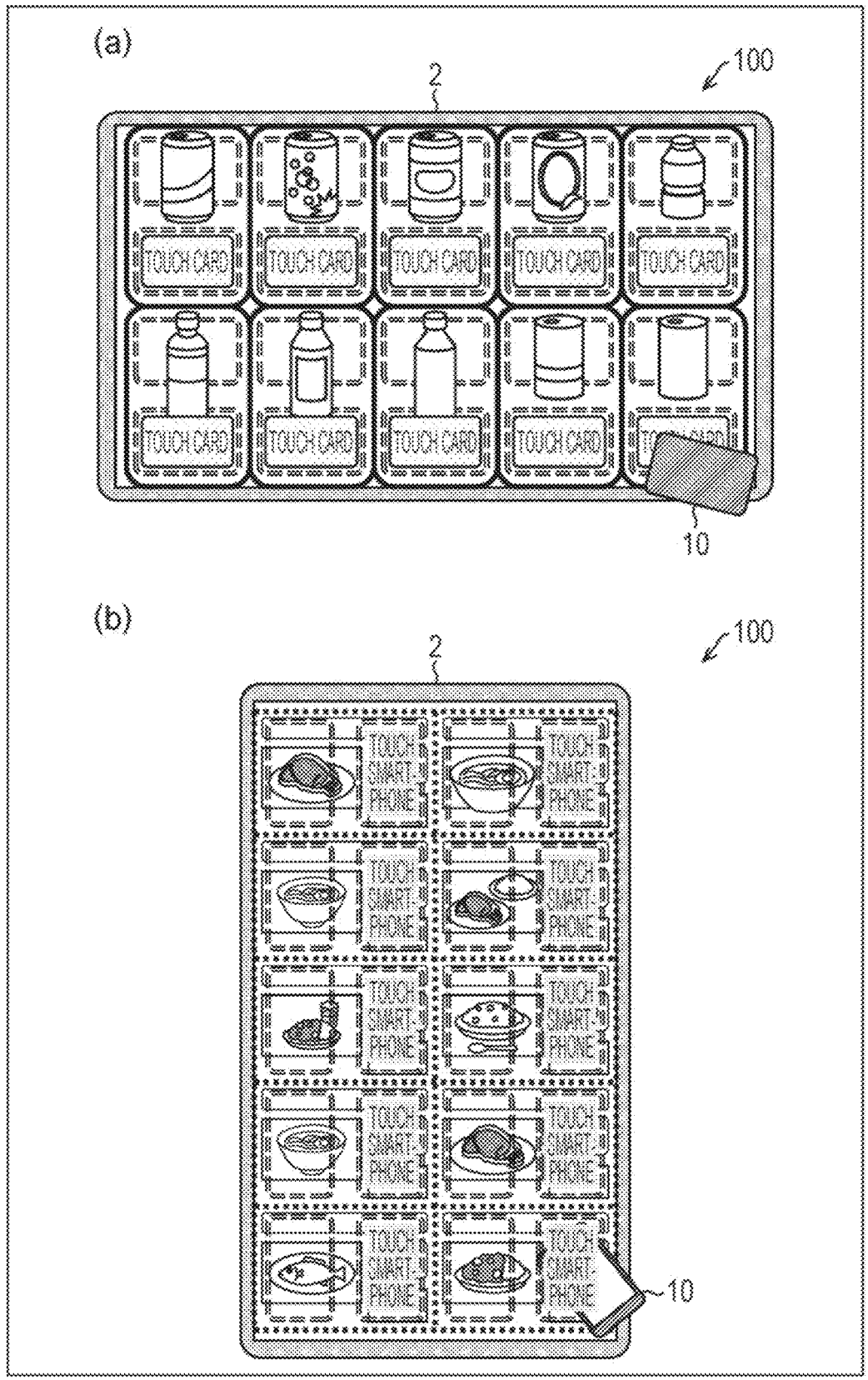
FIG. 8 is a view illustrating a screen example of the NFC display shown in FIG. 1.

Subsequently, with reference to FIG. 8, a specific example of the process executed by the NFC system 100 will be described. FIG. 8 is a view illustrating a screen example of the NFC display 2.

For example, the NFC system 100 may be a system for selling beverages as illustrated in FIG. 8(a). In this example, the NFC system 100 may be connected to be able to communicate with an automatic dispenser of the beverages. As illustrated in FIG. 8(a), when the information processing apparatus 1 is activated, the display control unit 24 of the information processing apparatus 1 causes the display unit 13 to display images of beverages and images to prompt a user to bring the NFC terminal 10 close to a location where the image of a beverage that the user wishes to purchase is displayed (images in which "touch a card" is described).

When a user keeps the NFC terminal 10 close to the location where the image of the beverage that the user wishes to purchase is displayed, the information processing apparatus 1 (processing execution unit 23) executes a purchase process of the beverage. Specifically, when the processing execution unit 23 determines, based on the terminal ID acquired, that the NFC terminal 10 is the NFC terminal 10 capable of performing the purchase process (settlement), the processing execution unit 23 instructs the NFC controller 14 to perform data transmission. Note that the NFC terminal 10 capable of performing the purchase process is, for example, a card-type NFC terminal 10 having an electronic money function but is not limited to this example.

The NFC controller 14 acquires information denoting the balance of the electronic money (hereinafter referred to as balance information) based on the data transmission with the NFC terminal 10. The processing execution unit 23 subtract the amount of money corresponding to the selected beverage from the amount of money denoted by the balance information. If the amount of money after the subtraction is 0 yen or more, the processing execution unit 23 determines that purchase of the beverage is possible, and the processing execution unit 23 controls the automatic dispenser to dispense the beverage selected. Moreover, the processing execution unit 23 instructs the NFC controller 14 to transmit information denoting the amount of money after the subtraction to the NFC terminal 10. The NFC controller 14 transmits, to the NFC terminal 10, information denoting the amount of money after the subtraction from the NFC antenna 12 that performs preceding data transmission.

On the other hand, if the amount of money after the subtraction is less than 0 yen, the processing execution unit 23 determines that purchase of the beverage is not possible. In this case, the processing execution unit 23 may, for example, instruct the display control unit 24 to cause the display unit 13 to display an image that shows a lack of the balance to a user.

Note that the purchase process of the beverage is not limited to the purchase by the electronic money charged in the NFC terminal 10. For example, the purchase process may be purchase by a credit card, or direct withdrawal of cash from an account of a user. In the former case, information transmitted by the data transmission from the NFC terminal 10 to the NFC system 100 is information of the credit card. Alternatively, in the latter case, the information is information on an account registered by the user in advance.

For example, the NFC system 100 may be a system for supplying a coupon as illustrated in FIG. 8(b). As illustrated in FIG. 8(b), the display control unit 24 causes the display unit 13 to display images of the contents of coupons and images to prompt a user to bring the NFC terminal 10 close to a location where the image of a coupon that the user wishes to purchase is displayed (an image in which "touch a smartphone" is described).

When a user keeps the NFC terminal 10 close to the location where the image of the coupon that the user wishes to purchase is displayed, the information processing apparatus 1 (processing execution unit 23) executes a supply process of the coupon. Specifically, when the processing execution unit 23 determines, based on the terminal ID acquired, that the NFC terminal 10 is a terminal device (for example, smartphone) capable of acquiring and displaying a coupon, the processing execution unit 23 instructs the NFC controller 14 to perform data transmission. Note that the terminal device capable of acquiring and displaying a coupon is not limited to the smartphone.

The NFC controller 14 acquires a terminal ID and a user ID in an application that manages coupons by the data transmission with the NFC terminal 10. The processing execution unit 23 controls the communication part (not shown), accesses the server of the application, and stores the user ID acquired and a coupon ID identifying the coupon which are associated with each other. Moreover, the processing execution unit 23 instructs the NFC controller 14 to transmit an URL of a Web page of a coupon that a user wishes to obtain no the NFC terminal 10. The NFC controller 14 transmits the URL to the NFC terminal 10 from the NFC antenna 12 that performs preceding data transmission. Note that the NFC system 100 may be configured to acquire data of a coupon (for example, image data) from the server and transmit the data of the coupon acquired to the NFC terminal 10 by the data transmission.

Moreover, the specific example of the process executed by the NFC System 100 is not limited to the two examples described above.

Effect of Information Processing Apparatus of First Embodiment

As described above, when the information processing apparatus 1 according to the present embodiment acquires a response signal to the detection signal sequentially a prescribed number of times, the information processing apparatus 1 performs the near field communication (data transmission) via the NFC antenna 12 that acquires the response signal. In other words, if the information processing apparatus 1 does not acquire the response signal sequentially a prescribed number of times, the information processing apparatus 1 does not perform the data transmission via the NFC antenna 12 that acquires the response signal. Thus, it is possible to prevent data transmission unintended by a user and execution of a process by the data transmission from being performed.

Figure 9:
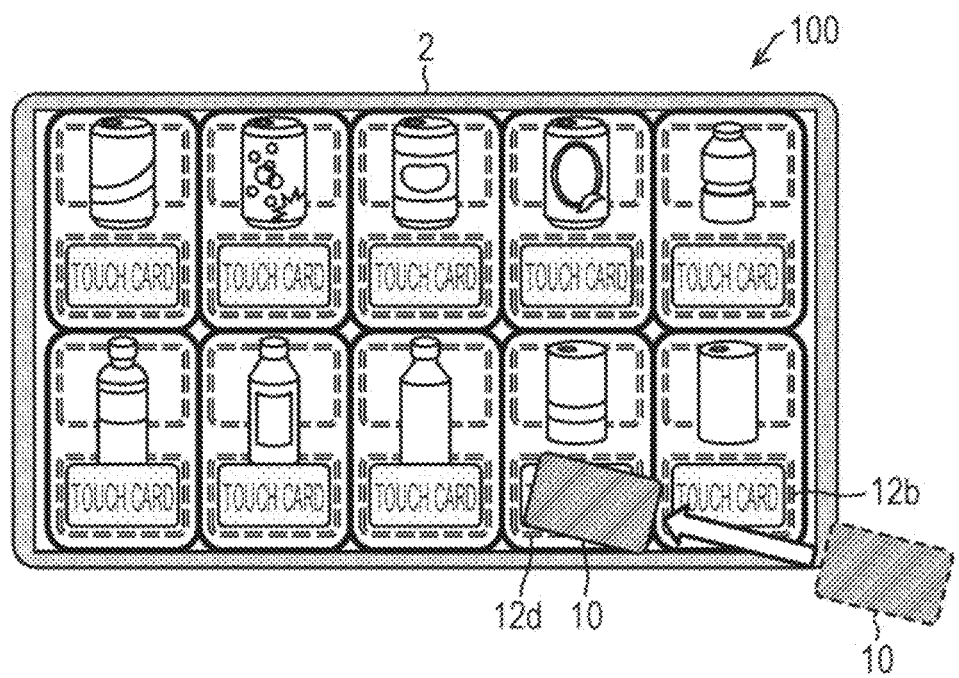
FIG. 9 is a view illustrating a screen example in the NFC system which performs a settlement process.

This is particularly effective in the NFC system 100 that performs the settlement process as described with reference to FIG. 8(a). This will be described with reference to FIG. 9. FIG. 9 is a view illustrating a screen example in the NFC system 100 which performs the settlement process.

As described in the figure, a case where a user moves the NFC terminal 10 to pass over the NFC antenna 12b to be close to the NFC antenna 12d is considered. That is, a user wants a beverage whose image displayed to be superimposed on the NFC antenna 12d. When the NFC terminal 10 is moved as described above, a conventional NFC system may perform a settlement process of a beverage whose image is displayed to be superimposed on the NFC antenna 12b when the NFC terminal 10 passes over the NFC antenna 12b. When the settlement process is performed, a user acquires a beverage which the user does not wish to acquire, and besides, the balance of the electronic money is reduced. Thus, when in the NFC system involving the settlement process, data transmission unintended by a user is performed, the user may suffer a loss.

In contrast, in the NFC system 100, the settlement process is not performed unless a user keeps the NFC terminal 10 above the NFC antenna 12 for a prescribed time. Thus, it is possible to prevent a user from suffering a loss caused due to unintended data transmission as described above.

Second Embodiment

Figure 10:
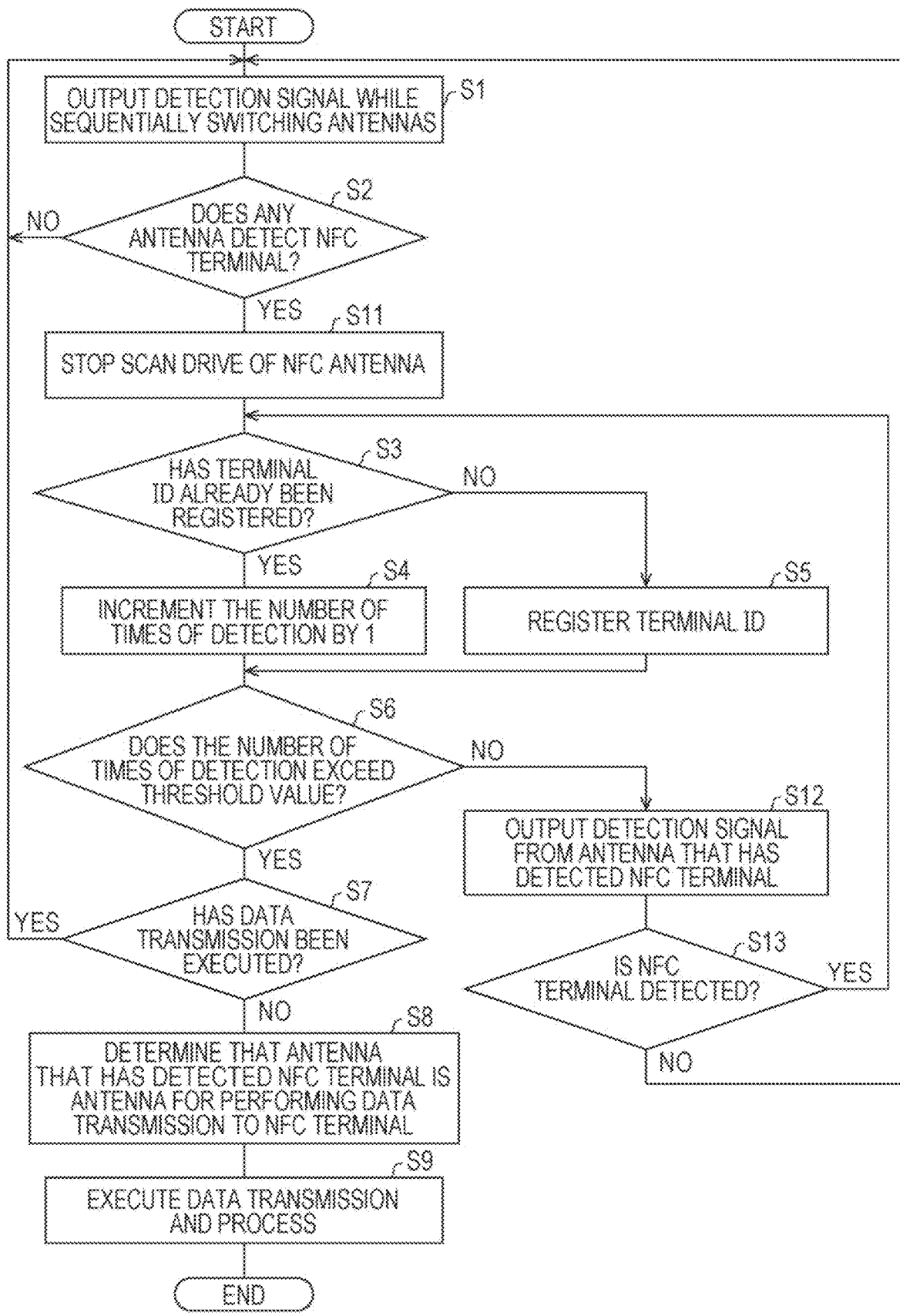
FIG. 10 is a flowchart illustrating an example of a flow of a process executed by an NFC system according to a second embodiment.

Another embodiment of the present disclosure will be described below with reference to FIG. 10. Note that in second to sixth embodiments and variations described below, for the sake of description, members having the same function as the members described in the above-described embodiment are denoted by the same reference signs, and the description thereof will be omitted.

An NFC system 100 according to the present embodiment stops scan drive when any one of NFC antennas 12 detects a NFC terminal 10. Then, the NFC system 100 repeats polling by the NFC antenna 12 with which the NFC terminal 10 is detected.

Specifically, when a digit which is included in a cell of "the number of times of detection" in the NFC table and which is obtained by an increment by 1 does not reach a predetermined digit, a continuation determination unit 21 according to the present embodiment gives an instruction to an NFC controller 14. This instruction is an instruction for causing the NFC antenna 12 denoted by an antenna ID acquired to output a detection signal again. The NFC controller 14 of the present embodiment receives the instruction and then outputs the detection signal again from the NFC antenna 12 with which the NFC terminal 10 is detected. When acquiring a response signal, the NFC controller 14 outputs the antenna ID denoting the NFC antenna 12 with which the NFC terminal 10 is detected and a terminal ID acquired to an information processing apparatus 1 again. That is, when the NFC terminal 10 is kept in proximity to the NFC antenna 12 denoted by the antenna ID acquired, the continuation determination unit 21 acquires the antenna ID denoting the NFC antenna 12 and the terminal ID again.

The continuation determination unit 21 repeats the process described in the preceding paragraph until the digit included in the cell of "the number of times of detection" reaches the predetermined digit.

Flow of Process Executed by NFC System 100

Next, with reference to FIG. 10, a flow of a process executed by the NFC system 100 of the present embodiment will be described. FIG. 10 is a flowchart illustrating an example of the flow of the process executed by the NFC system 100. Note that steps the same as the steps described in FIG. 7 are denoted by the same step numbers as those in FIG. 7, and the description thereof will be omitted.

When in step S2, any one of the NFC antennas 12 detects the NFC terminal 10 (YES in S2), the NFC controller 14 stops the scan drive of the NFC antennas 12 (S11). The NFC controller 14 transmits the terminal ID acquired from the NFC terminal 10 and the antenna ID of the NFC antenna 12 that detects the NFC terminal 10 to the control unit 20 of the information processing apparatus 1.

In step S6, if the number of times of detection does not exceed the threshold value (NO in S6), the continuous determination unit 21 gives an instruction to the NFC controller 14 to output the detection signal from the NFC antenna 12 indicated by the antenna ID acquired. The NFC controller 14 receives the instruction and then outputs the detection signal from the NFC antenna 12 with which the NFC terminal 10 is detected (S12).

If the NFC controller 14 does not detect the NFC terminal 10 (NO in S13), the continuation determination unit 21 deletes the terminal ID stored in a cell which is included in the cells in the column "terminal ID" and which is in the same row as the most recently acquired antenna ID. Moreover, the continuation determination unit 21 returns, to 0, the digit stored in a cell which is included in the cells of "the number of times of detections" and which is in the same row as the most recently acquired antenna ID. The process executed by the NFC system 100 returns to step S1.

In contrast, if the NFC controller 14 detects the NFC terminal 10 (YES in S13), the continuation determination unit 21 acquires the antenna ID and the terminal ID again. The process executed by the NFC system 100 returns to step S3.

Third Embodiment

Figure 11:
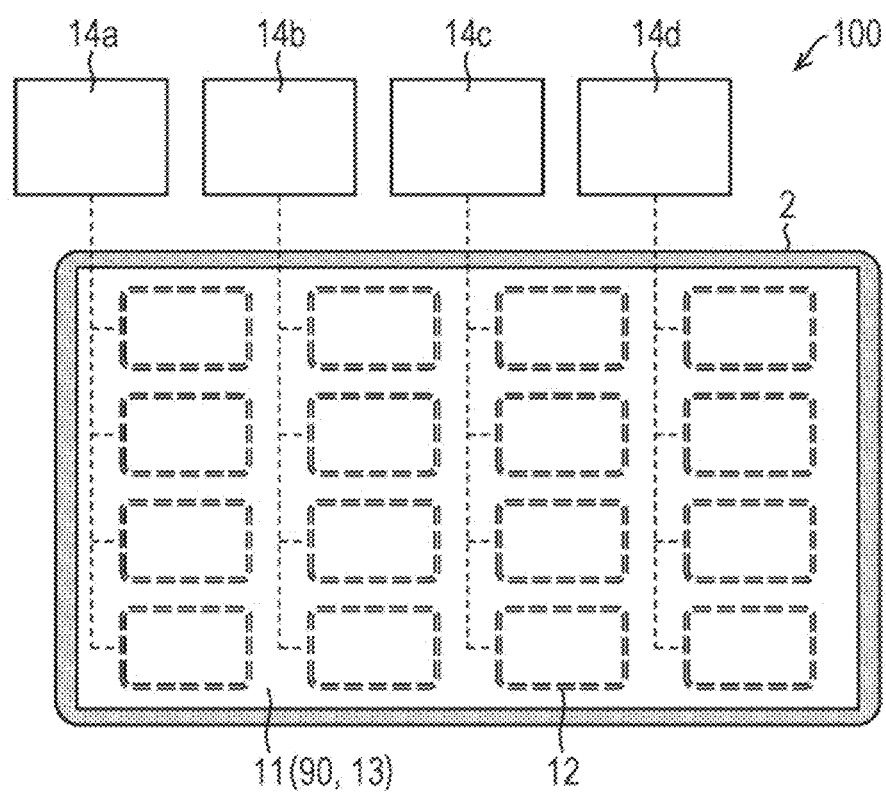
FIG. 11 is a view illustrating an example of wiring in an NFC display according to a third embodiment.

Still another embodiment of the present disclosure will be described below with reference to FIG. 11. FIG. 11 is a view illustrating an example of another wiring in the NFC display 2.

In the first and second embodiments, one NFC controller 14 is connected to be able to communicate with all the NFC antennas 12. With this configuration, in the NFC system 100 according to the first and second embodiments, only one NFC antenna 12 is in an actuated state during the scan drive.

However, when the number of NFC antennas 12 increases, it takes time in the NFC system 100 of the first embodiment to bring all the NFC antennas 12 into the actuated state once. Hereafter, to bring all the NFC antennas 12 into the actuated state once is referred to as "full-area scan".

Thus, in the NFC system 100 according to the present embodiment, as illustrated in FIG. 11, one NFC controller 14 is connected to one or more NFC antennas 12 of the NFC display 2. For example, one NFC controller 14 may be connected to the NFC antennas 12 in one longitudinal line. That is, as illustrated in the figure, each set of NFC antennas 12 in one longitudinal line may be connected to a corresponding one of an NFC controller 14a, an NFC controller 14b, an NFC controller 14c, and an NFC controller 14d. Alternatively, one NFC controller 14 may be connected to NFC antennas 12 in one lateral line, or one NFC controller 14 may be connected to one NFC antenna 12.

The NFC controllers 14a to 14d perform the scan drive on the NFC antennas 12 to which the NFC controllers 14a to 14d are connected. Thus, in the example shown in the figure, at most four NFC antennas 12 are brought into the actuated state at the same time. Thus, the NFC system 100 according to the present embodiment enables a time required to complete the full-surface scan to be reduced. Thus, when a plurality of NFC terminals 10 are in proximity to different NFC antennas 12, it is possible to reduce a time to detect each NFC terminal 10.

Note that the NFC system 100 according to the present embodiment has the following problems. That is, when adjacent NFC antennas 12 are brought into the actuated state at the same time, interference occurs, and normal communication with the NFC terminal 10 may not be performed.

To solve this problem, the NFC system 100 according to the present embodiment desirably performs the scan drive such that the adjacent NFC antennas 12 are not brought into the actuated state at the same time. For example, the control unit 20 of the information processing apparatus 1 may instruct each of the NFC controllers 14a to 14d to start the scan drive at different timings.

Moreover, for example, the control unit 20 of the information processing apparatus 1 may provide different pieces of drive order information to the NFC controllers 14a to 14d. In the example shown in the figure, the control unit 20 generates four pieces of driving order information for first driving NFC antennas 12 disposed in different rows and transmits the respective pieces of driving order information to the NFC controllers 14a to 14d. Thus, even when the NFC controllers 14a to 14d start the scan drive at the same timing, laterally adjacent NFC antennas 12 are not brought into the actuated state at the same time.

Alternatively, for example, the NFC controllers 14a to 14d may be configured to be able to communicate with each other, and the NFC controllers 14 are synchronized with each other to perform control such that the laterally adjacent NFC antennas 12 are not brought into the actuated state at the same time.

Fourth Embodiment

Still another embodiment of the present disclosure will be described below with reference to FIGS. 12 to 15.

Schema of NFC System 100a

Figure 13:
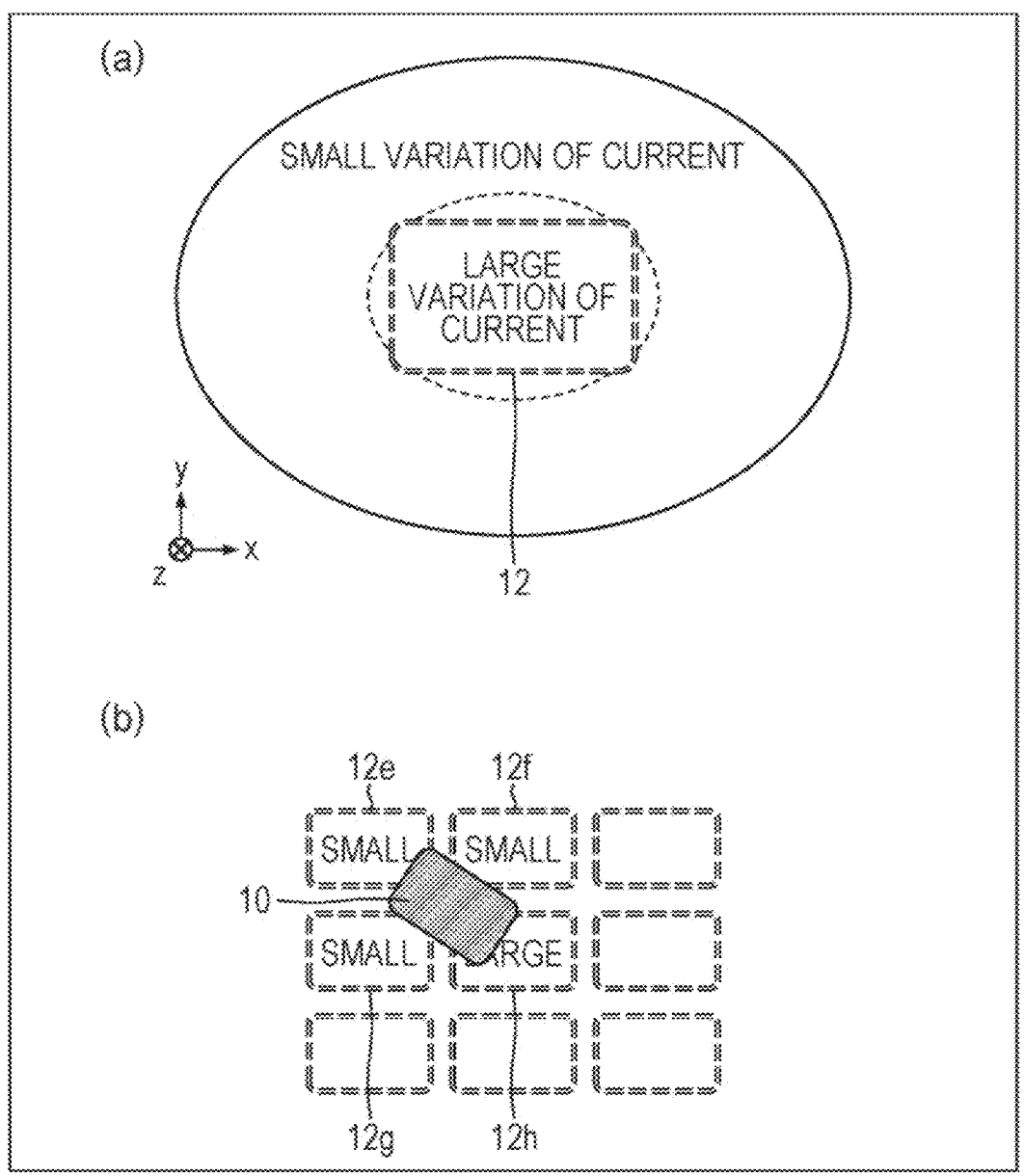
FIG. 13 is a view illustrating a variation of a current when an NFC terminal comes into proximity to an NFC antenna.

First, a schema of an NFC system 100a according to the present embodiment will be described with reference to FIG. 13. FIG. 13 is a view illustrating a variation of a current when an NFC terminal 10 comes into proximity to an NFC antenna 12.

When the NFC terminal 10 is brought into proximity to the NFC antenna 12, electromagnetic induction occurs between the NFC terminal 10 and the NFC antenna 12, and the value of a current flowing through the NFC antenna 12 changes. When along the z-axis shown in FIG. 13(a), the NFC terminal 10 is brought into proximity to the NFC antenna 12 in a circle indicated by a broken line, the variation of the current value in the NFC antenna 12 (hereinafter referred to as a "current variation") increases. On the hand, when along the z-axis, the NFC terminal 10 is brought into proximity to the NFC antenna 12 outside the circle indicated by the broken line and an inside a circle indicated by a solid line, the current variation in the NFC antenna 12 is smaller than that in a case where the NFC terminal 10 is brought into proximity in the circle indicated by the broken line. That is, when the NFC terminal 10 is brought into proximity to the NFC antenna 12 along the z-axis, the current variation in the NFC antenna 12 increases as the deviation between the NFC antenna 12 and the NFC terminal 10 in the x-axis direction and the y-axis direction decreases.

For example, when at a location shown in FIG. 13(b), the NFC terminal 10 is brought into proximity to the NFC antenna 12, the current variation in the NFC antenna 12h is larger than the current variation in each of the NFC antenna 12e, 12f, and 12g.

That is, based on the current variation, it is possible to specify an NFC antenna 12 to which the NFC terminal 10 is brought into proximity. Moreover, whether or not the current variation is maintained for a prescribed time is determined, and thereby, it is possible to determine whether or not a proximity state of the NFC terminal 10 to the NFC antenna 12 specified continues. Thus, when in an NFC antenna 12 with a large current variation, the current variation is maintained for a prescribed time, the NFC system 100a according to the present embodiment performs data transmission between the NFC antenna 12 and the NFC terminal 10 to perform a prescribed process.

Figure 12:
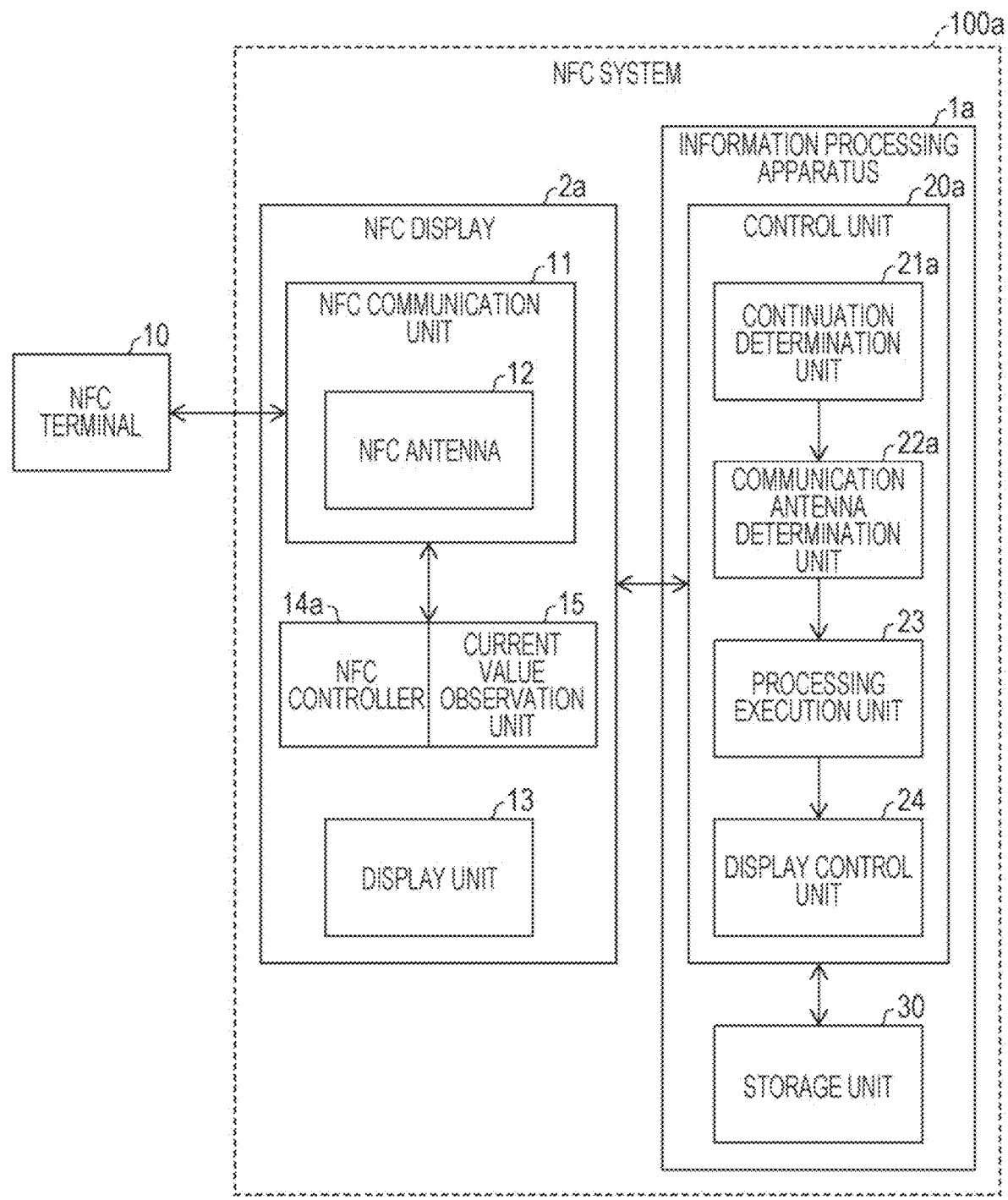
FIG. 12 is a functional block diagram illustrating an example of main components of an information processing apparatus and an NFC display included in an NFC system according to a fourth embodiment.
Figure 14:
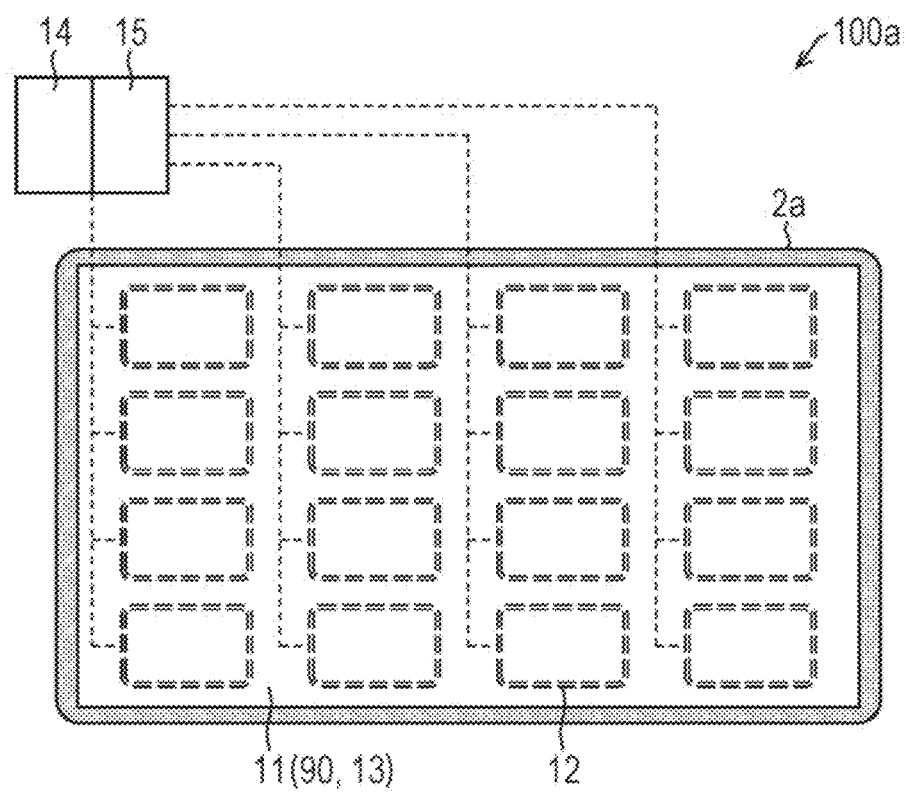
FIG. 14 is a view illustrating an example of wiring in the NFC display shown in FIG. 12.

Next, with reference to FIGS. 12 and 14, main components of an information processing apparatus 1a and an NFC display 2a included in the NFC system 100a according to the present embodiment will be described. FIG. 12 is a functional block diagram illustrating an example of the main components of the information processing apparatus 1a and the NFC display 2a included in the NFC system 100a according to the present embodiment. FIG. 14 is a view illustrating an example of wiring in the NFC display 2a.

Main Components of NFC Display 2a

Unlike the NFC display 2 described in the first embodiment, the NFC display 2a newly includes a current value observation unit 15. Moreover, the NFC display 2a includes an NFC controller 14a in place of the NFC controller 14 described in the first embodiment.

The current value observation unit 15 measures a current value generated in the NFC antenna 12. Specifically, the current value observation unit 15 is connected by wire to each NFC antenna 12 (see FIG. 14). Thus, the current value observation unit 15 enables a very small amount of current to flow to the NFC antenna 12 and is capable of measuring a time variation of the value of the current (hereinafter referred to as "current value").

In order to detect the NFC terminal 10, the current value observation unit 15 switches, in a prescribed order, the NFC antennas 12 whose current values are to be measured. The current value observation unit 15 according to the present embodiment acquires a control signal from a control unit 20a of the information processing apparatus 1a. The control signal includes observation order information and observation cycle information. The observation order information associates an antenna ID identifying the NFC antenna 12 with the order of observation of the current value. The observation cycle information shows the cycle of the observation. The current value observation unit 15 starts observation of the current values of the NFC antennas 12 according to the control signal. Note that the current value observation unit 15 according to the present embodiment performs the observation of the current value of each of the NFC antennas 12 once in a prescribed order and then repeats the observation of the current value in the prescribed order.

When in any of the NFC antenna 12, the current variation from a reference value exceeds the threshold value, the current value observation unit 15 transmits, to the information processing apparatus 1a, the antenna ID of the NFC antenna 12 whose current variation exceeds the threshold value. Note that the reference value is at least a current value in a case where the NFC terminal 10 and the NFC antenna 12 are not in proximity to each other in such a distance in which communication is possible.

The current value observation unit 15 continues the observation of the current values and transmission of the time course data until the current value observation unit 15 receives, from the information processing apparatus 1a, a resume instruction of switching the NFC antennas 12 and a stop instruction of current value observation. When the current value observation unit 15 receives the resume instruction, the current value observation unit 15 resumes the observation of the current values in the prescribed order. On the other hand, when the current value observation unit 15 receives the stop instruction, the current value observation unit 15 stops the observation of the current values.

Moreover, as illustrated in FIG. 1 and FIG. 13, the current value observation unit 15 according to the present embodiment is integrated with the NFC controller 14a. Note that the configuration that the NFC controller 14a and the current value observation unit 15 are integrated with each other is not essential. For example, the current value observation unit 15 may be provided separately from the NFC controller 14a. In this example, each NFC antenna 12 is connected to the current value observation unit 15 via a cable different from that used for the NFC controller 14a.

The NFC controller 14a according to the present embodiment outputs a detection signal from the NFC antenna 12 specified by the antenna ID received and transitions to a standby state for a response signal. When receiving the response signal, the NFC controller 14a transmits a terminal ID included in the response signal to the information processing apparatus 1a. In contrast, when the NFC controller 14a does not receive the response signal within the prescribed time, the NFC controller 14a outputs the resume instruction of switching the NFC antennas 12 to the current value observation unit 15. Moreover, in this case, the NFC controller 14a transmits a notification that no NFC terminal 10 is detectable to the information processing apparatus 1a.

Main Components of Information Processing Apparatus 1a

Unlike the information processing apparatus 1 described in the first embodiment, the information processing apparatus 1a includes the control unit 20a in place of the control unit 20. The control unit 20a includes a continuation determination unit 21a and a communication antenna determination unit 22a in place of the continuation determination unit 21 and the communication antenna determination unit 22 described in the first embodiment.

The continuation determination unit 21a determines, as to the NFC antenna 12 which is included in the plurality of NFC antennas 12 and which the NFC terminal 10 is in proximity to, whether or not a proximity state of the NFC terminal 10 continues. Specifically, the continuation determination unit 21a refers to a table stored in the storage unit so as to determine whether or not the proximity state of the NFC terminal 10 continues. Note that the table is a table including only columns "antenna No." and "the number of times of detections" of the columns of the NFC table shown in FIG. 6. When the continuation determination unit 21a acquires the antenna ID from the NFC controller 14, the continuation determination unit 21a increments, by 1, the digit included in a cell which is included in cells of "the number of times of detection" and which is in the same row as the cell storing the terminal ID acquired. The continuation determination unit 21a determines whether or not a digit obtained by incrementing the digit by 1 reaches a prescribed digit. Here, an example in which the prescribed digit is 5 will be described.

If the digit obtained by incrementing the digit by 1 does not reach 5, the continuation determination unit 21a stands by until the continuation determination unit 21a acquires the antenna ID from the NFC controller 15 again. In contrast, if the digit obtained by incrementing the digit by 1 reaches 5, the continuation determination unit 21a determines, as to the NFC antenna 12 which the NFC terminal 10 is in proximity to, that the proximity state of the NFC terminal 10 continues. The continuation determination unit 21a outputs the antenna ID acquired to the communication antenna determination unit 22a.

That is, the continuation determination unit 21a determines that the proximity state of the NFC terminal 10 continues when a variation equal to or more than a prescribed value from a reference value of a current value measured at each NFC antenna 12 continues for a prescribed time at an NFC antenna 12.

The communication antenna determination unit 22a determines the NFC antenna 12 that performs the data transmission. The communication antenna determination unit 22a is different from the communication antenna determination unit 22 in that when receiving the antenna ID, the communication antenna determination unit 22a transmits the stop instruction of the current value observation to the current value observation unit 15. The communication antenna determination unit 22a receives a terminal ID from the NFC controller 14a in response to the stop instruction. The communication antenna determination unit 22a determines that the NFC antenna 12 specified by the antenna ID acquired from the continuation determination unit 21a is the NFC antenna 12 that performs the data transmission. The communication antenna determination unit 22a outputs the terminal ID to the processing execution unit 23. In contrast, when the communication antenna determination unit 22a receives a notification that the NFC terminal 10 is undetectable from the NFC controller 14a as a response to the stop instruction, the communication antenna determination unit 22a terminates the process.

Flow of Process Executed by NFC System 100a

Figure 15:
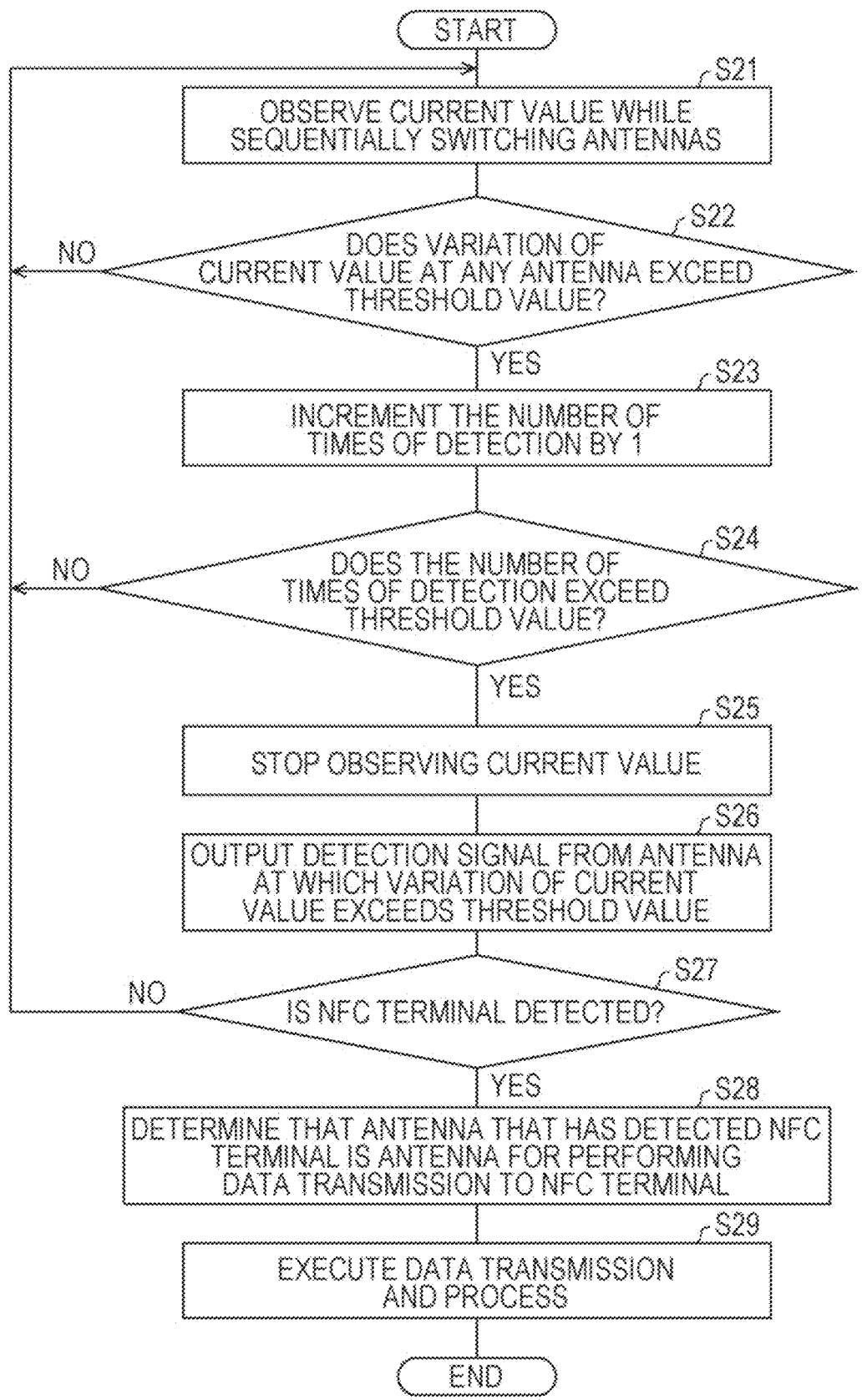
FIG. 15 is a flowchart illustrating an example of a flow of a process executed by the NFC system shown in FIG. 12.

Next, with reference to FIG. 15, a flow of a process executed by the NFC system 100a will be described. FIG. 15 is a flowchart illustrating an example of the flow of the process executed by the NFC system 100a.

First, the current value observation unit 15 of the NFC display 2a starts observing the current value in accordance with the control signal from the control unit 20a of the information processing apparatus 1a. Specifically, the current value observation unit 15 sequentially switches the NFC antennas 12 and observes the current value of each NFC antenna 12 (S21). The current value observation unit 15 repeats the process in step S21 until the current variation exceeds the threshold value at any one of the NFC antennas (NO in S22).

When the current variation at any of the NFC antenna 12 exceeds the threshold value (YES in S22), the current value observation unit 15 transmits, to the control unit 20a of the information processing apparatus 1a, the antenna ID of the NFC antenna 12 whose current variation exceeds the threshold value.

When receiving the antenna ID, the continuation determination unit 21a of the controller 20a increments the number of times of detection by 1 (S23) in a cell which is included in cells of "the number of times of detection" and which is in the same row as the cell storing the antenna ID acquired. Then, the continuation determination unit 21a determines whether or not the number of times of detection of the NFC terminal 10 exceeds the threshold value (S24). If the number of times of detection does not exceed the threshold value (NO in S24), the process executed by the NFC system 100a returns to step S1.

On the other hand, if the number of times of detection exceeds the threshold value (YES in S24), the continuation determination unit 21a outputs the antenna ID acquired to the communication antenna determination unit 22a. When receiving the antenna ID, the communication antenna determination unit 22a transmits the stop instruction of the current value observation to the current value observation unit 15. When receiving the stop instruction, the current value observation unit 15 stops the current value observation (S25) and outputs the antenna ID of the NFC antenna 12 whose current variation exceeds the threshold value to the NFC controller 14a.

The NFC controller 14a outputs the detection signal from the NFC antenna 12 indicated by the antenna ID acquired (S26). If the NFC controller 14a does not detect the NFC terminal 10 (NO in S27), the NFC controller 14a outputs the resume instruction of switching the NFC antennas 12 to the current value observation unit 15. Thus, the process executed by the NFC system 100a returns to step S1.

On the other hand, if the NFC controller 14a detects the NFC terminal 10 (YES in S27), the NFC controller 14a transmits, to the antenna determination unit 22a, the terminal ID acquired from the NFC terminal 10. When the communication antenna determination unit 22a receives the terminal ID, the communication antenna determination unit 22a determines that the NFC antenna 12 indicated by the antenna ID acquired from the continuation determination unit 21a is the NFC antenna 12 that performs the data transmission to the NFC terminal 10 (S28). The continuation antenna determination unit 22a outputs the antenna ID acquired to the processing execution unit 23.

When the processing execution unit 23 acquires the antenna ID, the processing execution unit 23 executes data transmission and the prescribed process (S29). The description of step S29 will be omitted in this embodiment because the process in step S29 is similar to the process in step S9 of FIG. 7 described in the first embodiment. Thus, the process executed by the NFC system 100a ends.

Fifth Embodiment

Figure 16:
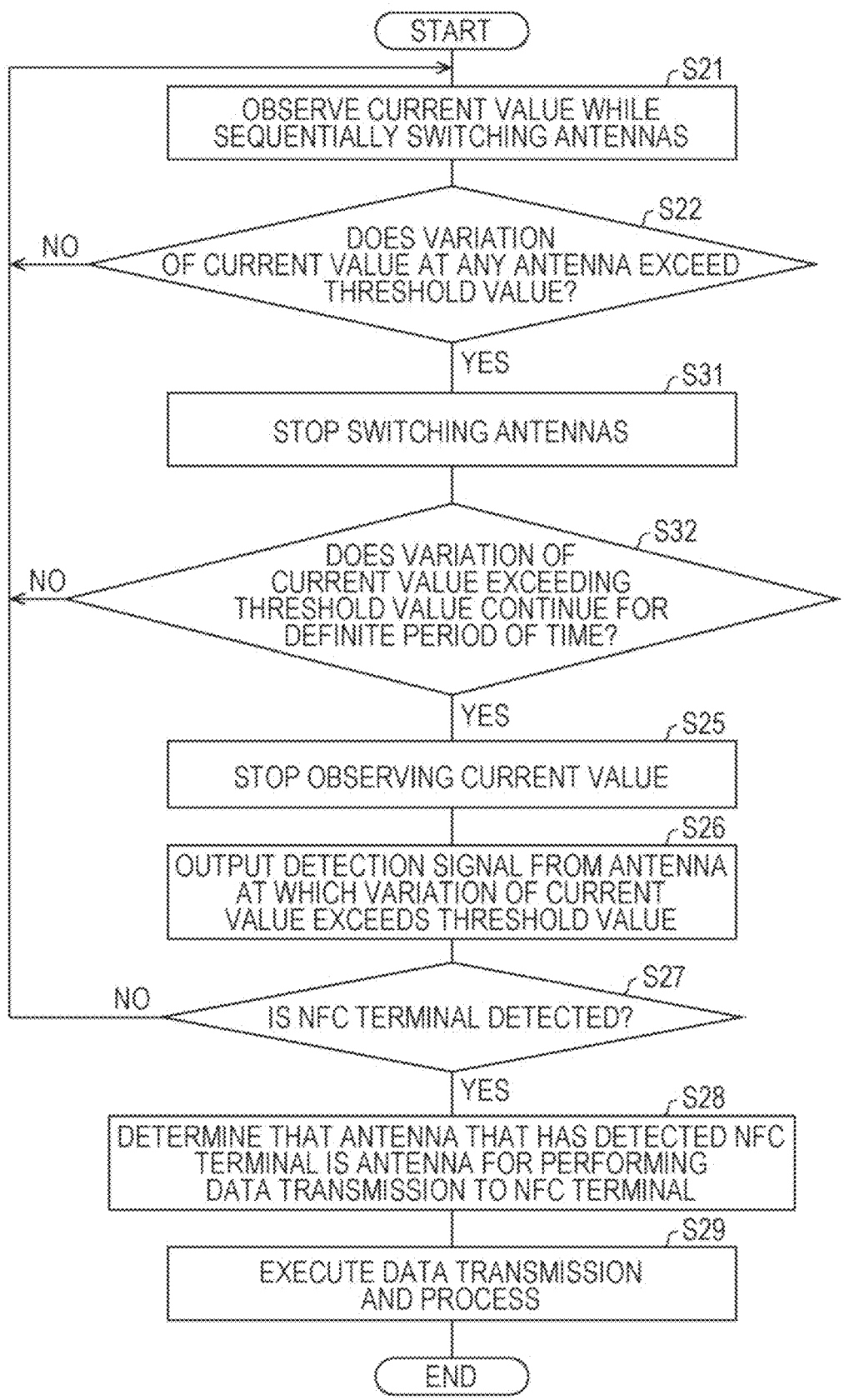
FIG. 16 is a flowchart illustrating an example of a flow of a process executed by an NFC system according to a fifth embodiment.

Still another embodiment of the present disclosure will be described below with reference to FIG. 16.

When detecting that the variation of a current value in any one of NFC antennas 12 exceeds a threshold value, an NFC system 100a (current value observation unit 15) according to the present embodiment stops switching the NFC antennas 12. The current value observation unit 15 continues observing the current value of the NFC antenna 12 whose variation of the current value exceeds the threshold value.

Specifically, when detecting that the variation of a current value in any one of NFC antennas 12 exceeds a threshold value, the current value observation unit 15 transmits, to an information processing apparatus 1a, the current value together with an antenna ID of the NFC antenna 12 whose variation of the current value exceeds the threshold value. Moreover, the current value observation unit 15 also transmits, to the information processing apparatus 1a, a current value obtained by continuing current value observation. That is, the current value observation unit 15 continues observing and transmitting a current value to the information processing apparatus 1a until receiving a stop instruction of the current value observation from the information processing apparatus 1a.

When a continuation determination unit 21a of the information processing apparatus 1a acquires the current value, the continuation determination unit 21a controls a timer (not shown) to measure a continuation time of a state where a current variation exceeds the threshold value.

When the continuation time exceeds or equals a prescribed time, the continuation determination unit 21a determines, as to the NFC antenna 12 which the NFC terminal 10 is in proximity to, that a proximity state of the NFC terminal 10 continues. The continuation determination unit 21a outputs the antenna ID acquired to the communication antenna determination unit 22a. In contrast, when the continuation time ends before reaching the prescribed time, the continuation determination unit 21a transmits the resume instruction of switching the NFC antennas 12 to the current value observation unit 15.

That is, the continuation determination unit 21a determines that the proximity state of the NFC terminal 10 continues when a variation equal to or more than a prescribed value from a reference value of a current value measured at each NFC antenna 12 continues for a prescribed time at an NFC antenna 12.

Flow of Process Executed by NFC System 100a

Next, with reference to FIG. 16, a flow of a process executed by the NFC system 100a according to the present embodiment will be described. FIG. 16 is a flowchart illustrating an example of the flow of the process executed by the NFC system 100a. Note that steps the same as the steps described in FIG. 15 are denoted by the same step numbers as those in FIG. 15, and the description thereof will be omitted.

When in step S22, the current value variation exceeds the threshold value in any one of the NFC antennas 12 (YES in S22), the current value observation unit 15 stops switching the NFC antennas 12 (S31). The current value observation unit 15 transmits the current value and the antenna ID of the NFC antenna 12 whose variation of the current value exceeds the threshold value to a control unit 20a of the information processing apparatus 1a. Moreover, the current value observation unit 15 also transmits, to the control unit 20a of the information processing apparatus 1a, a current value obtained by continuing current value observation.

The continuation determination unit 21a of the control unit 20a determines whether or not the variation of the current value exceeding the threshold value continues for a definite period of time during the time variation of the current value received (S32). When continuation determination unit 21a determines that the variation of the current value does not continue for the definite period of time (NO in S32), the continuation determination unit 21a transmits the resume instruction of switching the NFC antennas 12 to the current value observation unit 15. The process executed by the NFC system 100a returns to step S21.

In contrast, when continuation determination unit 21a determines that the variation of the current value continues for the definite period of time (YES in S32), the continuation determination unit 21a outputs the antenna ID acquired to the communication antenna determination unit 22a. When receiving the antenna ID, the communication antenna determination unit 22a transmits a stop instruction of current value observation to the current value observation unit 15.

The flow of the subsequent process is similar to that in the NFC system 100a according to the fourth embodiment, and therefore, the description thereof will be omitted.

Sixth Embodiment

Figure 17:
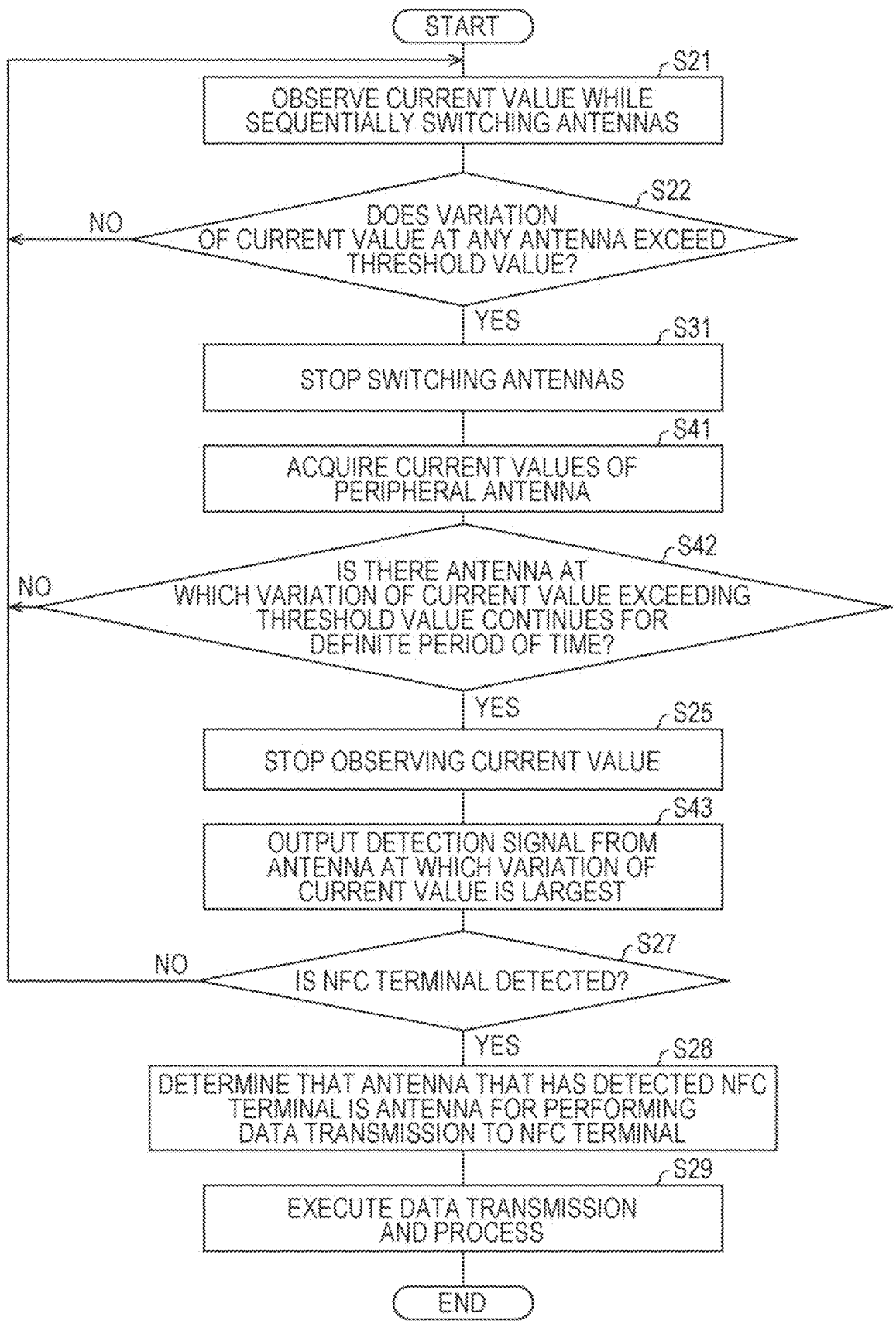
FIG. 17 is a flowchart illustrating an example of a flow of a process executed by an NFC system according to a sixth embodiment.

Still another embodiment of the present disclosure will be described below with reference to FIG. 17.

In the fourth and fifth embodiments, the NFC antennas 12 whose current values are to be observed are switched in a prescribed order, and as to the NFC antenna 12 whose variation of the current value (current variation) exceeds the threshold value, whether or not the proximity state of the NFC terminal 10 continues is determined.

Here, the NFC antenna 12 whose current variation exceeds the threshold value is highly probably the NFC antenna 12 via which data transmission is desired by a user. Alternatively, the NFC antenna 12 whose current variation exceeds the threshold value may be a peripheral NFC antenna 12 around the NFC antenna 12 via which data transmission is desired by a user.

In the case of the configuration according to the fourth and fifth embodiments, however, it is not possible to determine whether or not the NFC antenna 12 whose current variation exceeds the threshold value is the NFC antenna 12 via which data transmission is desired by a user. Specifically, the NFC antenna 12 whose current variation exceeds the threshold value can alternatively be the peripheral NFC antenna 12 around the NFC antenna 12 desired by a user. Moreover, when the NFC antenna 12 whose current variation exceeds the threshold value is the peripheral NFC antenna 12, the NFC antenna 12 whose current variation exceeds the threshold value is not the NFC antenna 12 via which data transmission is desired by a user, and therefore, data transmission not intended by the user is performed. In this case, a process different from the user's intention may be performed, and the user may suffer a loss.

Therefore, in the present embodiment, a configuration will be described which enables a NFC antenna 12 in accordance with the intention of a user to be more accurately selected so as to be able to perform data transmission.

Specifically, when a current variation from a reference value exceeds a threshold value in any one of NFC antennas 12, a current value observation unit 15 according to the present embodiment acquires not only a current value of the NFC antenna 12 but also a current value of the peripheral NFC antenna 12. Then, these current values are associated with respective antenna IDs of the NFC antennas 12 and are transmitted to the information processing apparatus 1a. Note that "peripheral NFC antenna 12" refers to an NFC antenna 12 adjacent to the NFC antenna 12 whose current variation exceeds the threshold value.

Moreover, when in a plurality of current values, a continuation time equals to or exceeds a prescribed time, a continuation determination unit 21a according to the present embodiment outputs all antenna IDs associated with the current values to a communication antenna determination unit 22a.

Moreover, when the communication antenna determination unit 22a according to the present embodiment receives the plurality of antenna IDs from the continuation determination unit 21a, the communication antenna determination unit 22a refers to time variation of the current values. The communication antenna determination unit 22a specifies an antenna ID associated with a time variation whose current variation from the reference value is largest, and the communication antenna determination unit 22a transmits the antenna ID and a stop instruction of current value observation to the current value observation unit 15.

That is, when a plurality of NFC antennas 12 have changes that continue for a prescribed time, the communication antenna determination unit 22a determines that an NFC antenna 12 whose current variation is largest is the NFC antenna 12 that performs the data transmission to the NFC terminal 10.

Moreover, when the current value observation unit 15 according to the present embodiment receives the stop instruction, the current value observation unit 15 stops the current value observation and outputs the antenna ID received to the NFC controller 14a. This enables the NFC controller 14a to output a detection signal from the NFC antenna 12 whose current variation from the reference value is largest. That is, the NFC antenna 12 whose current variation is largest is the NFC antenna 12 which is closest to the NFC terminal 10. That is, the NFC controller 14a can output a detection signal from the NFC antenna 12 which is most likely to be the NFC antenna 12 whose data transmission is desired.

Thus, the NFC system 100a according to the present embodiment securely performs data transmission by using the NFC antenna 12 whose short-distance wireless communication is desired by a user to execute the process.

Flow of Process Executed by NFC System 100a

Next, with reference to FIG. 17, a flow of a process executed by the NFC system 100a will be described. FIG. 17 is a flowchart illustrating an example of the flow of the process executed by the NFC system 100a according to the present embodiment. Note that steps the same as the steps described in FIG. 16 are denoted by the same step numbers as those in FIG. 16, and the description thereof will be omitted.

When the current value observation unit 15 stops switching the NFC antennas 12 in step S31, the current value observation unit 15 acquires a current value of the NFC antenna 12 whose current variation exceeds the threshold value and a peripheral NFC antenna 12 around the NFC antenna 12 (S41). The current value observation unit 15 associates these current values with respective antenna IDs of the NFC antennas 12 and transmits to the control unit 20a of the information processing apparatus 1a.

The continuation determination unit 21a of the control unit 20a determines whether or not the plurality of current values received includes a current value whose variation of the current value exceeding the threshold value continues for a definite period of time (S42). If the continuation determination unit 21a determines that the current value whose variation of the current value exceeding the threshold value continues for the definite period of time is included (YES in S42), all pieces of time course data of the current values whose variation exceeding the threshold value continues for the definite period of time are output together with their associated antenna IDs to the communication antenna determination unit 22a. The NFC system 100a executes the process in step S25. In contrast, when the continuation determination unit 21a determines that there is no current value variation continues for the definite period of time (NO in S42), the continuation determination unit 21a transmits the resume instruction of switching the NFC antennas 12 to a current value observation unit 15. The process executed by the NFC system 100a returns to step S21.

When the current value observation unit 15 stops current value observation in step S25, the current value observation unit 15 outputs, to the NFC controller 14a, the antenna ID which is obtained from the communication antenna determination unit 22a and which is associated with time course data whose current variation from the reference value is largest. The NFC controller 14a outputs the detection signal from the NFC antenna 12 indicated by the antenna ID acquired (S43).

Variations

Figure 18:
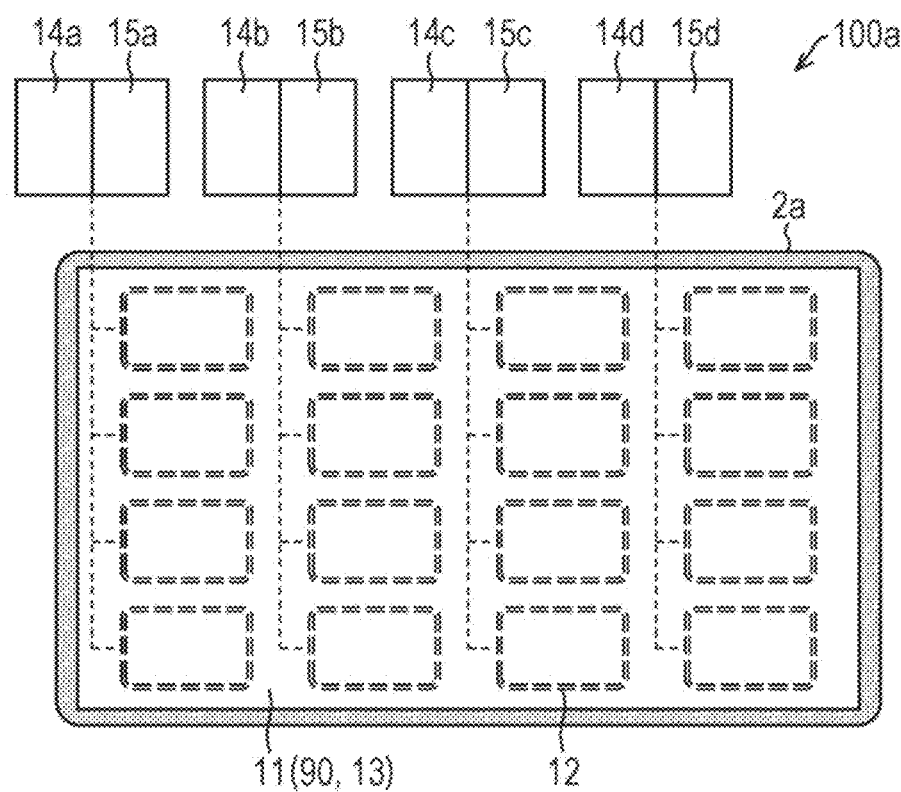
FIG. 18 is a view illustrating an example of wiring in an NFC display included in an NFC system according to a variation of the fourth to sixth embodiments.
Figure 19:
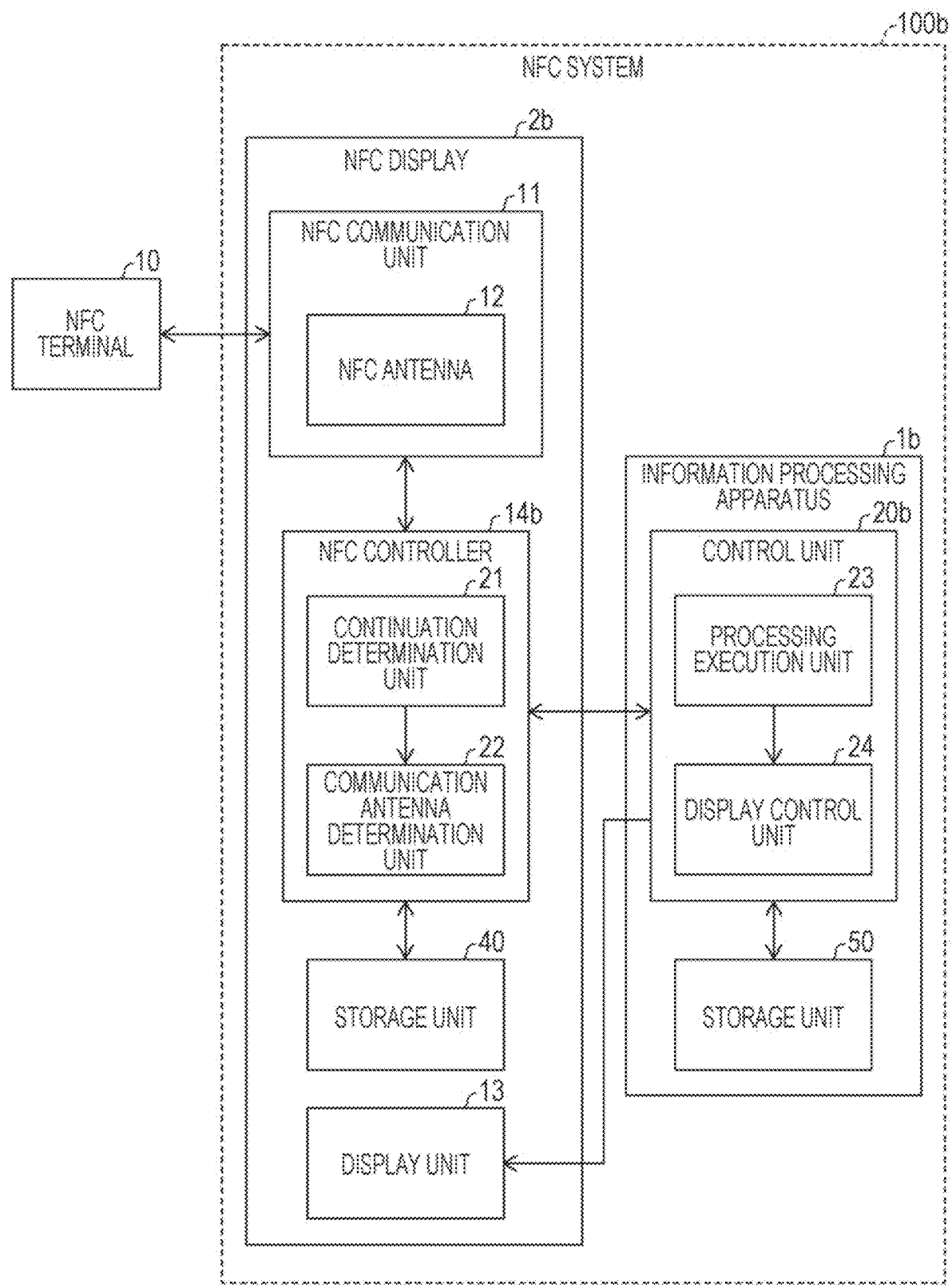
FIG. 19 is a functional block diagram illustrating an example of main components of an information processing apparatus and an NFC display included in an NFC system according to another variation.
Figure 20:
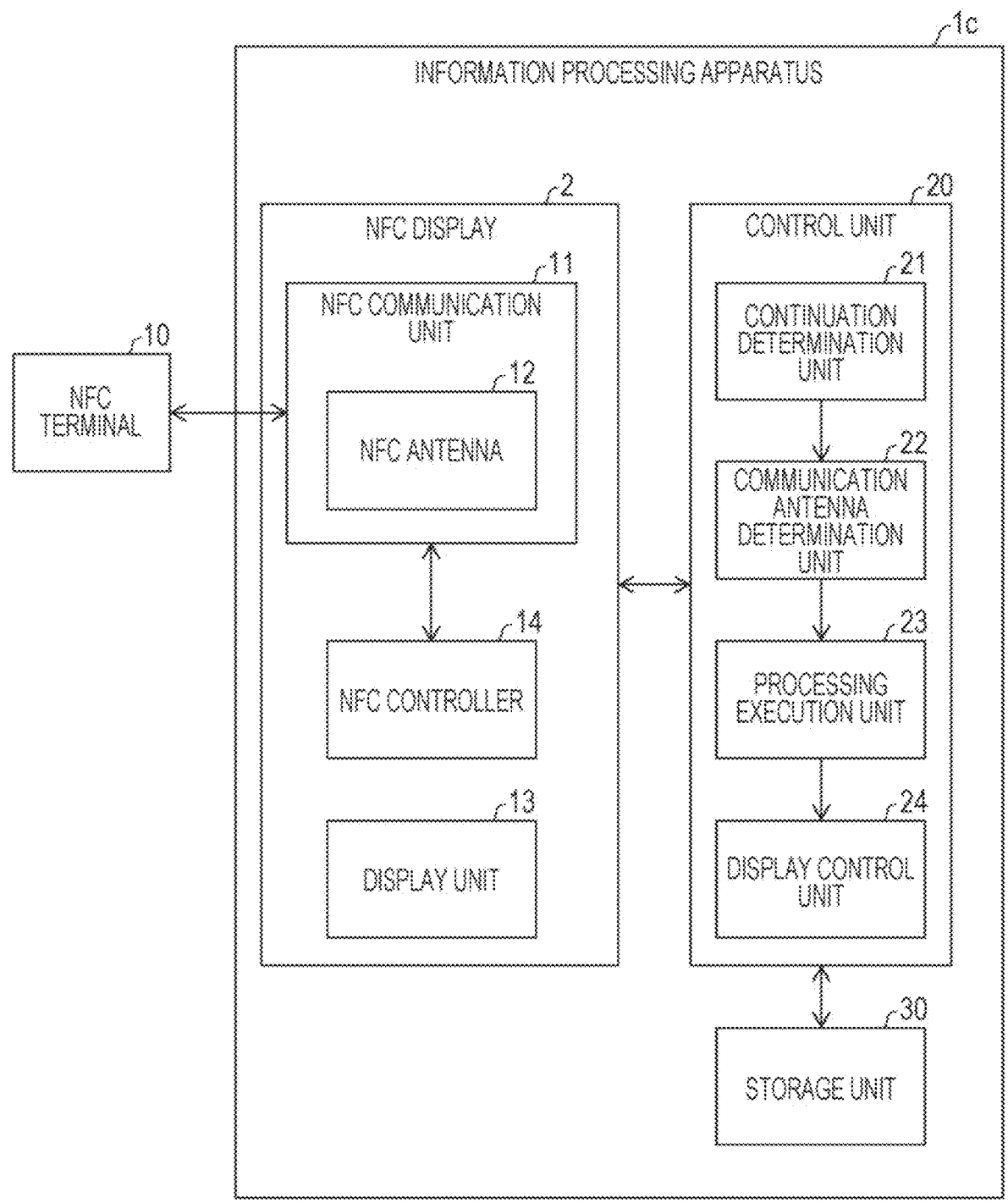
FIG. 20 is a functional block diagram illustrating an example of main components of an information processing apparatus according to still another variation.
Figure 21:
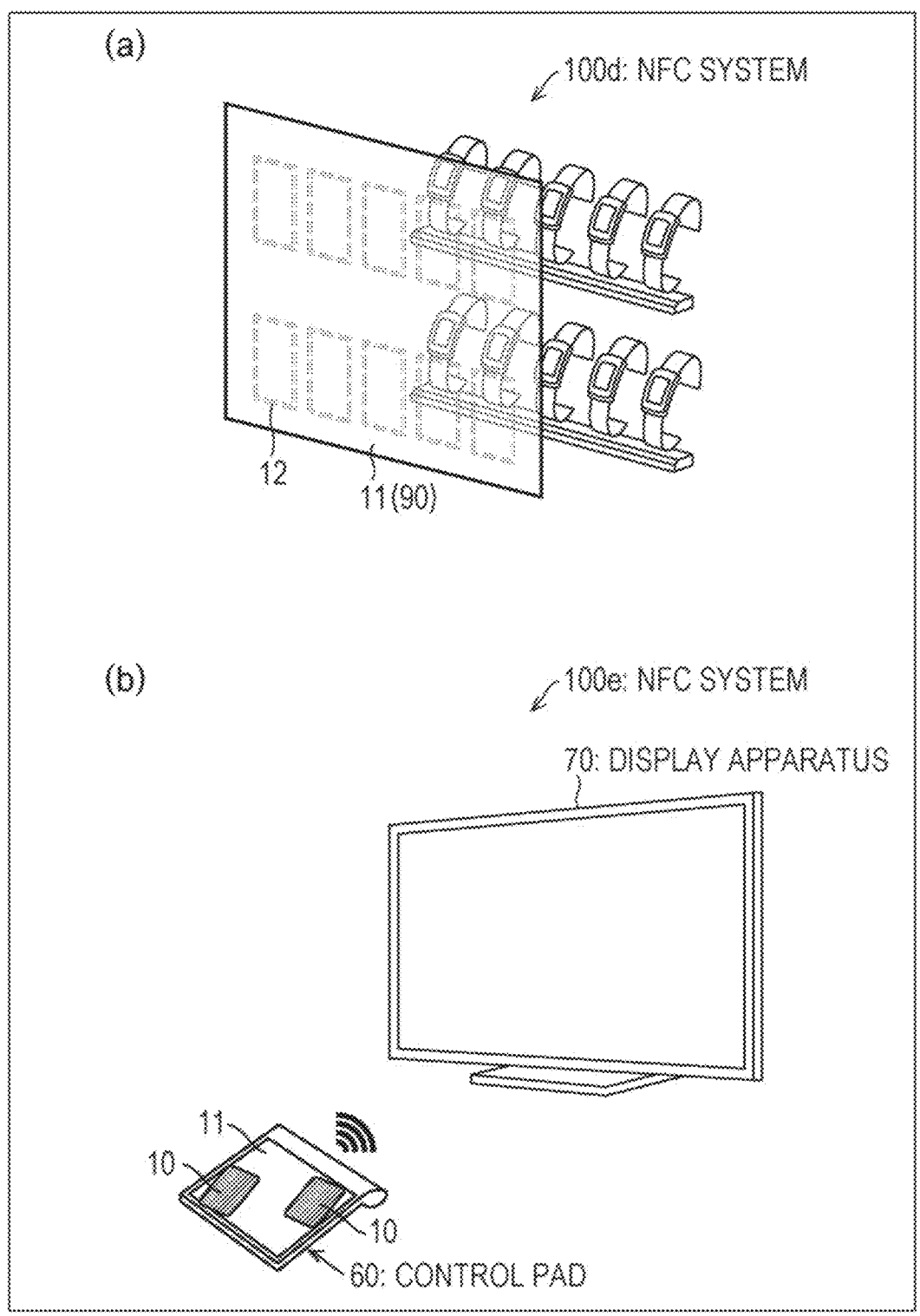
FIG. 21 is a view illustrating an outline of an NFC system according to yet another variation.

Variations of at least one embodiment of the embodiments will be described with reference to FIGS. 18 to 21. FIG. 18 is a view illustrating an example of wiring in an NFC display 2a according to a variation of the fourth to sixth embodiments. FIG. 19 is a functional block diagram illustrating an example of main components of an information processing apparatus 1b and an NFC display 2b included in an NFC system 100b. FIG. 20 is a functional block diagram illustrating an example of main components of an information processing apparatus 1c. FIG. 21 is a view illustrating an overview of the NFC system 100d and an NFC system 100e.

Variation of NFC System 100a

The NFC system 100a according to the fourth to sixth embodiments may include, in the NFC display 2a, one NFC controller 14a and one current value observation unit 15 connected for each of one or more NFC antennas 12.

For example, as illustrated in FIG. 18, each set of NFC antennas 12 in one longitudinal column is connected to a corresponding one of the NFC controllers 14a to 14d, and each set of NFC antennas 12 in one longitudinal is connected. to a corresponding one of the current value observation units 15a to 15d.

The current value observation units 15a to 15d measure current values of the NFC antennas 12 to which the respective current value observation unis 15a to 15d are connected while the NFC antennas 12 are sequentially switched. Thus, in the example shown in the figure, current values of at most four NFC antennas 12 can be measured at the same time. Thus, the NFC system 100a according to the present variation enables a time required to complete measuring of current values of all NFC antennas 12 to be reduced. Thus, when a plurality of NFC terminals 10 are in proximity to different NFC antennas 12, it is possible to reduce the time until each NFC terminal 10 is detected.

Schema of NFC System 100b

The NFC system 100b according to the present variation includes the information processing apparatus 1b and the NFC display 2b as illustrated in FIG. 19. Unlike the information processing apparatus 1 described in the first embodiment, the information processing apparatus 1b includes a control unit 20b and a storage unit 50 in place of the control unit 20 and the storage unit 30. Moreover, the NFC display 2b includes an NFC controller 14b (control device) is place of the NFC controller 14 unlike the NFC display 2 described in the first embodiment. Moreover, the NFC display 2b newly includes a storage unit 40.

The control unit 20b does not include the continuation determination unit 21 and the communication antenna determination unit 22. Instead, the continuation determination unit 21 and the communication antenna determination unit 22 are included in the NFC controller 14b. That is, the NFC system 100b according to the present variation performs determination of whether or not the proximity state of the NFC terminal 10 continues and determination of the NFC antenna 12 that performs the data transmission by the NFC display 2b.

Note that various types of data used by the continuation determination unit 21 and the communication antenna determination unit 22 are stored in the storage unit 40. For example, an NFC table is stored in the storage unit 40. On the other hand, various types of data used by the process execution unit 23 and the display control unit 24 are stored in the storage unit 50. For example, an image to be displayed in the display unit 13 is stored in the storage unit 50. Note that the variation is also applicable to the second to sixth embodiments.

Information Processing Apparatus 1c

The information processing apparatus 1c according to the present variation is integrated with the NFC display 2 as illustrated in FIG. 20. For example, the information processing apparatus 1c of the present variation may be a tablet terminal on which the NFC display 2 is mounted. Note that the information processing apparatus 1c is at least an information processing apparatus including the NFC display 2, and the application example of the information processing apparatus 1c is not limited to the tablet terminal.

Other Embodiments

As an NFC system 100d shown in FIG. 21(a), the NFC system according to one aspect of the present disclosure may have a configuration without the display unit 13. For example, the NFC system 100d is configured such that a plurality of items (in the example shown in the figure, wristwatches) are displayed such that the NFC antennas 12 are superimposed behind the NFC communication unit 11 including a plurality of NFC antennas 12. Although not shown in the figure, the NFC antenna 12 is connected to be able to communicate with the NFC controller 14 and the information processing apparatus 1.

A user brings, for example, a smartphone (NFC terminal 10) capable of performing near field communication into proximity to an NFC antenna 12 located in front of the desired wristwatch, which allows the user to view item information on the wristwatch by using the smartphone.

Moreover, for example, a user brings the NFC terminal 10 having a checkout function into proximity to an NFC antenna 12 located in front of the desired wristwatch desired by the user, which allows the user to purchase the wristwatch.

Alternatively, as the NFC system 100e shown in FIG. 21(b), the NFC system according to one aspect of the present disclosure may have a configuration in which the NFC communication unit 11 and the display unit 13 are different components. For example, the NFC system 100e includes a control pad 60 including the NFC communication unit 11 and a display apparatus 70. Although not shown in the figure, the control pad 60 is configured to be able to communicate with the NFC controller 14 and the information processing apparatus 1. Moreover, the display apparatus 70 is connected to be able to communicate with the information processing apparatus 1.

The NFC system 100e performs, for example, on the control pad 60, displaying according to a place where the NFC terminal 10 is placed and/or the type of the NFC terminal 10 by using the display apparatus 70. For example, the display apparatus 70 changes the display location and/or the display contents in accordance with a location where the NFC terminal 10 is placed and/or the type of the NFC terminal 10.

The NFC display in the NFC system according to one aspect of the present disclosure may have a configuration including a touch panel. In this example, the NFC system may be configured to switch display for the NFC communication or select items in accordance with the touch operation performed by a user. For example, the NFC system connected to be able to communicate with an automatic dispenser may be configured to drive an NFC antenna in the periphery of the display location of the item when receiving a touch operation for item selection.

Moreover, the storage unit included in the NFC system according to one aspect of the present disclosure may be memory connected to be able to communicate with the information processing apparatus or the NFC display. For example, the memory may be memory (a so-called cloud server) connected to the information processing apparatus or the NFC display via a network.

Moreover, the NFC system according to one aspect of the present disclosure may be configured to alternately perform the scan drive described in the first to third embodiments of the present disclosure and the current value observation described in the fourth to sixth embodiments.

Example of Actualization by Software

The information processing apparatuses 1, 1a to 1c and control blocks (in particular, control units 20, 20a, 20b and the NFC controller 14b) of the NFC display 2b may be realized by a logic circuit (hardware) formed on an integrated circuit (IC chip) or the like. Moreover, the control block may be realized by software by using a Central Processing Unit (CPU).

In the latter case, the information processing apparatus 1, 1a to 1c and the NFC display 2b each include a CPU configured to execute a command of a program as software for realizing each function, Read Only Memory (ROM) or memory (which are referred to as "recording medium") in which the program and various types of data are stored in a computer (or CPU) readable manner, Random Access Memory (RAM) in which the program is to be expanded, and the like. The computer (or CPU) reads the program from the recording medium and executes the program to achieve the object of the present disclosure. As the recording medium, a "non-transitory tangible medium", for example, a tape, a disk, a card, semiconductor memory, a programmable logic circuit, or the like may be used. The program may be supplied to the computer over any transmission medium (for example, communication network or broadcast wave) that is capable of transmitting the program. Note that, an aspect of the present disclosure can be embodied also in a form of a data signal in which the program is realized by electronic transmission and which is embedded in a carrier wave.

Summary

A control device (information processing apparatus 1, 1a to 1c, NFC controller 14b) according to a first aspect of the present disclosure is a control device configured to control a communication apparatus (NFC display 2, 2a, 2b) including a plurality of antennas (NFC antennas 12) for performing near field communication with an information communication terminal (NFC terminal 10), the control device including: a continuation determination unit (continuation determination unit 21, 21a) configured to, as to an antenna which is included in the plurality of antennas and which the information communication terminal is in contact with or proximity to, determine whether or not a contact or proximity state of the information communication terminal continues; and a communication antenna determination unit (communication antenna determination unit 22, 22a) configured to, when the continuation determination unit determines that the contact or proximity state of the information communication terminal continues, determine that the antenna to which the information communication terminal is in proximity is an antenna which performs near field communication for executing a prescribed process.

With this configuration, when as to the antenna which the information communication terminal is in contact with or proximity to, it is determined that contact or proximity state of the information communication terminal continues, the control device determines that the antenna is an antenna which performs near field communication for executing a prescribed process.

That is, the control device determines that the antenna, which a user keeps the information communication terminal to be in contact with or proximity to, is an antenna which performs near field communication for executing a prescribed process. In other words, as to an antenna which the information communication terminal comes into contact with or proximity to and then, in a short time, leaves, the control device does not determine that the antenna is an antenna which performs near field communication for executing a prescribed process.

Thus, the control device enables the antenna desired by a user to perform near field communication and execute a process. In other words, the control device is configured to prevent an unwanted process from being performed due to near field communication based on a process performed via an antenna which is not intended by a user.

In a control device according to a second aspect of the present disclosure referring to the first aspect, the continuation determination unit may be configured to, in case of a presence of an antenna which continuously receives from the information communication terminal a prescribed number of times a response to a detection signal for detecting the information communication terminal transmitted from the communication apparatus, determine that the contact or proximity state of the information communication terminal continues at the antenna.

With this configuration, when the response to the detection signal is continuously acquired a prescribed number of times, the control device determines that the contact or proximity state of the information communication terminal continues.

Thus, the control device enables maintenance of a distance to be specified, the distance allowing near field communication between an antenna that once acquired a response to the detection signal and the information communication terminal. Therefore, the control device enables continuation of the contact or proximity state of the information communication terminal to be accurately determined.

In a control device according to a third aspect of the present disclosure referring to the first aspect, the continuation determination unit may be configured to, in case of presence of an antenna at which a variation of a current value measured at each of the plurality of antennas from a reference value by a prescribed value or more continues for a prescribed time, determine that the contact or proximity state of the information communication terminal continues at the antenna.

With this configuration, when at the antenna at which a variation of the current value from the reference value by the prescribed value or more occurs, the variation continues for the prescribed time, the control device determines that the contact or proximity state of the information communication terminal continues. Thus, the control device determines that the contact or proximity state of the information communication terminal continues without transmission and reception of information to and from the information communication terminal.

In a control device according to a fourth aspect of the present disclosure referring to the third aspect, the communication antenna determination unit may be configured to, in case of presence of a plurality of antennas at which the variation continues for the prescribed time, determine that an antenna whose variation of the current is largest is an antenna that performs near field communication with the information communication terminal.

With this configuration, in case of presence of a plurality of antennas at which the variation of the current value continues for the prescribed time, the control device determines that the antenna whose variation of the current value is largest is an antenna that performs the near field communication. That is, the control device determines that the antenna located closest to the information communication terminal is the antenna that performs the near field communication. Thus, even in a case where there are a plurality of candidates of an antenna that performs the near field communication, the control device enables an antenna whose near field communication is desired by a user to be accurately selected.

A method for controlling a control device according to a fifth aspect of the present disclosure is a method for controlling a control device configured to control a communication apparatus including a plurality of antennas for performing near field communication with an information communication terminal, the method includes: a continuation determination step (step S6) of determining, as to an antenna which is included in the plurality of antennas and which the information communication terminal is in contact with or proximity to, whether or not a contact or proximity state of the information communication terminal continues; and a communication antenna determination step (step S8) of, when the continuation determination step determines that the contact or proximity state of the information communication terminal continues, determining that the antenna to which the information communication terminal is in proximity is an antenna which performs near field communication for executing a prescribed process.

According to the method, an effect similar to that of the control device is obtained.

The control device according to each aspect of the present disclosure may be realized by a computer. In this case, a control program of a control device and a computer-readable recording medium storing the control program are also within the scope of the present disclosure. The control program causes the computer to operate as each component (software element) included in the control device and realizes the control device by the computer.

The present disclosure is not limited to the embodiments described above, and various modifications may be made within the scope of the claims. The present disclosure also encompasses, in its technical scope, any embodiment derived by combining technical means disclosed in differing embodiments.

CROSS-REFERENCE OF RELATED APPLICATION

The present disclosure contains subject matter related to that disclosed in Japanese Priority Patent Application JP 2017-017060 filed in the Japan Patent Office on Feb. 1, 2017, the entire contents of which are hereby incorporated by reference.

REFERENCE SIGNS LIST 1, 1a, 1b, 1c INFORMATION PROCESSING APPARATUS (CONTROL DEVICE)
2, 2a, 2b NFC DISPLAY (COMMUNICATION APPARATUS)
10 NFC TERMINAL (INFORMATION COMMUNICATION TERMINAL)
12 NFC ANTENNA (ANTENNA)
14b NFC CONTROLLER (CONTROL DEVICE)
21, 21a CONTINUATION DETERMINATION UNIT
22, 22a COMMUNICATION ANTENNA DETERMINATION UNIT

The invention claimed is:

1. A control device configured to control a communication apparatus including a plurality of antennas for performing near field communication with an information communication terminal, the control device including:
   a continuation determination unit configured to, as to an antenna which is included in the plurality of antennas and which the information communication terminal is in contact with or proximity to, determine whether or not a contact or proximity state of the information communication terminal continues, the continuation determination unit being configured to, in case of presence of an antenna at which a variation of a current value measured at each of the plurality of antennas from a reference value by a prescribed value or more continues for a prescribed time, determine that the contact or proximity state of the information communication terminal continues at the antenna; and
   a communication antenna determination unit configured to, when the continuation determination unit determines that the contact or proximity state of the information communication terminal continues, determine that the antenna to which the information communication terminal is in proximity is an antenna which performs near field communication for executing a prescribed process.

2. The control device according to claim 1, wherein the communication antenna determination unit is configured to, in case of presence of a plurality of antennas at which the variation continues for the prescribed time, determine that an antenna whose variation of the current is largest is an antenna that performs near field communication with the information communication terminal.

3. A method for controlling a control device configured to control a communication apparatus including a plurality of antennas for performing near field communication with an information communication terminal, the method includes:

a continuation determination step of determining, as to an antenna which is included in the plurality of antennas and which the information communication terminal is in contact with or proximity to, in case of presence of an antenna at which a variation of a current value measured at each of the plurality of antennas from a reference value by a prescribed value or more continues for a prescribed time, that a contact or proximity state of the information communication terminal continues; and a communication antenna determination step of, when the continuation determination step determines that the contact or proximity state of the information communication terminal continues, determining that the antenna to which the information communication terminal is in proximity is an antenna which performs near field communication for executing a prescribed process.

4. The method according to claim 3, wherein in the communication antenna determination step, in case of presence of a plurality of antennas at which the variation continues for the prescribed time, it is determined that an antenna whose variation of the current is largest is an antenna that performs near field communication with the information communication terminal.

* * * * *